US011473711B2

United States Patent
Rogers

(10) Patent No.: US 11,473,711 B2
(45) Date of Patent: Oct. 18, 2022

(54) SYSTEM PULSATION DAMPENER DEVICE(S) SUBSTITUTING FOR PULSATION DAMPENERS UTILIZING COMPRESSION MATERIAL THEREIN

(71) Applicant: Performance Pulsation Control, Inc., Richardson, TX (US)

(72) Inventor: John Thomas Rogers, Garland, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 0 days.

(21) Appl. No.: 16/404,248

(22) Filed: May 6, 2019

(65) Prior Publication Data

US 2019/0257462 A1   Aug. 22, 2019

Related U.S. Application Data

(63) Continuation-in-part of application No. 16/157,952, filed on Oct. 11, 2018.
(Continued)

(51) Int. Cl.
*F16L 55/04* (2006.01)
*E21B 21/01* (2006.01)
(Continued)

(52) U.S. Cl.
CPC ............. *F16L 55/04* (2013.01); *E21B 21/01* (2013.01); *F04B 11/0091* (2013.01); *F04B 11/00* (2013.01); *F04B 39/0027* (2013.01)

(58) Field of Classification Search
CPC ..................................................... F15D 1/025
(Continued)

(56) References Cited

U.S. PATENT DOCUMENTS 2,290,337 A    7/1942  Knauth
2,757,689 A *  8/1956  Knox ................... F16L 55/053
                                                        138/30
(Continued)

FOREIGN PATENT DOCUMENTS

SU          1686246 A1   10/1991
WO      2019/083736 A1    5/2019

OTHER PUBLICATIONS

ISA/US, "International Search Report and Written Opinion of the International Searching Authority," International Application No. PCT/US2018/055485, dated Dec. 10, 2018, 13 pages.‡
(Continued)

*Primary Examiner* — Robert K Arundale
*Assistant Examiner* — Richard K. Durden

(57) ABSTRACT

A fluid delivery system including at least a housing for a charge-free pulsation dampener of a type utilizing elastomeric compression material, but without the compression material therein, includes a system pulsation dampener. The fluid delivery system includes a fluid reservoir, a fluid pump, a manifold, a pulsation dampener, and piping. The fluid reservoir stores a fluid used for a drilling procedure. The fluid pump pumps the fluid from the fluid reservoir through the fluid delivery system. The manifold is located downstream from the fluid pump, and receives and combines fluids from the at least one fluid pump. The pulsation dampener receives the combined fluid from the manifold, and dampens residual pulsations from the manifold. The piping receives fluid output from the pulsation dampener, and transfers the fluid received from the pulsation dampener further downstream.

22 Claims, 17 Drawing Sheets

Related U.S. Application Data

(60) Provisional application No. 62/577,567, filed on Oct. 26, 2017, provisional application No. 62/635,374, filed on Feb. 26, 2018.

(51) Int. Cl.
*F04B 11/00* (2006.01)
*F04B 39/00* (2006.01)

(58) Field of Classification Search
USPC .......................................................... 138/40
See application file for complete search history.

(56) References Cited

U.S. PATENT DOCUMENTS

| | | | | |
|---|---|---|---|---|
| 2,773,455 A * | 12/1956 | Mercier | ................ | F16L 55/052 |
| | | | | 417/540 |
| 3,444,897 A | 5/1969 | Erickson | | |
| 3,587,652 A | 6/1971 | Remus | | |
| 3,665,965 A | 5/1972 | Baumann | | |
| 3,731,709 A * | 5/1973 | Glover | ................... | F16L 55/04 |
| | | | | 138/37 |
| 3,840,051 A | 10/1974 | Akashi et al. | | |
| 3,894,562 A | 7/1975 | Moseley, Jr. et al. | | |
| 4,269,569 A ‡ | 5/1981 | Hoover | ................ | F04B 49/007 |
| | | | | 417/34 |
| 4,445,829 A * | 5/1984 | Miller | ..................... | F16L 55/05 |
| | | | | 137/565.34 |
| 4,514,151 A * | 4/1985 | Anders | ............... | F04B 11/0016 |
| | | | | 138/26 |
| 4,570,745 A | 2/1986 | Sparks et al. | | |
| 4,585,400 A ‡ | 4/1986 | Miller | ..................... | F16L 55/05 |
| | | | | 137/56 |
| 4,644,974 A | 2/1987 | Zingg | | |
| 5,495,872 A | 3/1996 | Gallagher et al. | | |
| 5,868,168 A | 2/1999 | Mott et al. | | |
| 6,741,185 B2 | 5/2004 | Shi et al. | | |
| 6,848,477 B2 | 2/2005 | Treusch et al. | | |
| 7,051,765 B1 | 5/2006 | Kelley et al. | | |
| 7,123,161 B2 ‡ | 10/2006 | Jeffryes | ................... | E21B 47/18 |
| | | | | 340/85 |
| 7,198,102 B2 ‡ | 4/2007 | Virally | ................... | E21B 21/08 |
| | | | | 166/24 |
| 7,345,594 B2 | 3/2008 | Huang et al. | | |
| 8,449,500 B2 | 5/2013 | DelCastillo et al. | | |
| 9,845,795 B2 † | 12/2017 | Manley | | |
| 2006/0109141 A1* | 5/2006 | Huang | ................ | G01V 11/002 |
| | | | | 340/855.4 |
| 2012/0152360 A1* | 6/2012 | Marica | .................. | F04B 17/048 |
| | | | | 137/1 |
| 2012/0189477 A1 | 7/2012 | Rogers | | |
| 2013/0037153 A1 | 2/2013 | Schommer | | |
| 2014/0076577 A1* | 3/2014 | Shampine | ............ | F16L 55/041 |
| | | | | 166/373 |
| 2014/0118157 A1‡ | 5/2014 | Jamison | ................ | E21B 47/12 |
| | | | | 340/85 |
| 2015/0064027 A1‡ | 3/2015 | Leugemors | ............ | F04B 43/02 |
| | | | | 417/53 |
| 2015/0240982 A1‡ | 8/2015 | Eisner | ................... | F16L 41/021 |
| | | | | 166/30 |
| 2015/0284811 A1* | 10/2015 | Knight | ................. | C12Q 1/6874 |
| | | | | 506/2 |
| 2017/0067456 A1* | 3/2017 | Manley | ............... | F04B 39/0027 |
| 2017/0130706 A1 | 5/2017 | Plaza et al. | | |
| 2017/0159868 A1 | 6/2017 | Fisher | | |
| 2018/0128410 A1‡ | 5/2018 | Rogers | ................... | B01D 29/11 |
| 2019/0128462 A1‡ | 5/2019 | Rogers | ................... | E21B 21/08 |
| 2019/0257462 A1‡ | 8/2019 | Rogers | ................... | F16L 55/04 |
| 2019/0285220 A1 | 9/2019 | Eros et al. | | |
| 2019/0293058 A1† | 9/2019 | Manley | | |
| 2020/0132237 A1‡ | 4/2020 | Rogers | ................... | F16L 55/04 |

OTHER PUBLICATIONS

Sigma Drilling Technology, LLC, commercial website, screenshots obtained Nov. 22, 2019; effective date Oct. 1, 2014—see Sigma Drilling Technologies "Terms & Conditions" final sentence, 23 pages.‡

Hon. Amos L. Mazzant, III, Report on the Filing or Determination of an Action Regarding a Patent or Trademark Re: U.S. Appl. No. 61/878,174, filed Sep. 16, 2013, Justin Manley; U.S. Appl. No. 62/037,901, filed Aug. 14, 2014, Justin Manley; U.S. Appl. No. 14/846,872, filed Sep. 7, 2015, Justin Manley and William Garfield, Judgment Entered May 9, 2019; Case 4:17-cv-00450-ALM Performance Pulsation Control, Inc. v. Sigma Drilling Technologies, LLC, Justin P. Manley, et al. United States District Court, Eastern District of Texas, Sherman Division, 1 page.‡

United States Trademark Registration U.S. Pat. No. 5,127,212—Charge Free Conversion Kit, 2 pages.‡

Notification of Transmittal of the International Search Report and the Written Opinion of the International Searching Authority, or the Declaration dated Jul. 31, 2020 in connection with International Patent Application No. PCT/US2020/31698, 9 pages.‡

Notification of Transmittal of the International Search Report and the Written Opinion of the International Searching Authority, or the Declaration dated Jul. 21, 2020 in connection with International Patent Application No. PCT/US2020/31335, 10 pages.‡

International Search Report and Written Opinion of the International Searching Authority regarding International Application No. PCT/US2018/055485, dated Dec. 10, 2018, 13 pages.

Office Action dated Oct. 8, 2020 in connection with U.S. Appl. No. 16/157,952, 27 pages.

Final Office Action dated May 7, 2021 in connection with U.S. Appl. No. 16/157,952, 17 pages.

Office Action dated Sep. 27, 2021 in connection with U.S. Appl. No. 16/157,952, 28 pages.

Office Action dated Sep. 27, 2021 in connection with U.S. Appl. No. 16/730,621, 26 pages.

Interview Summary dated Oct. 29, 2021 in connection with U.S. Appl. No. 16/157,952, 3 pages.

Interview Summary dated Oct. 29, 2021 in connection with U.S. Appl. No. 16/730,621, 3 pages.

International Search Report and Written Opinion of the International Searching Authority dated Jan. 19, 2022, in connection with International Application No. PCT/US2021/054621, 9 pages.

Office Action dated Jun. 16, 2022, in connection with Algerian Application No. DZ/P/2021/000753, 3 pages.

Examination report dated Apr. 29, 2022, in connection with Indian Application No. 202127055212, 5 pages.

Final Office Action dated May 24, 2022, in connection with U.S. Appl. No. 16/157,952, 28 pages.

Notice of Allowance dated May 26, 2022, in connection with U.S. Appl. No. 16/730,621, 17 pages.

Non-final Office Action dated Jun. 13, 2022, in connection with U.S. Appl. No. 17/450,673, 15 pages.

Examination report dated Aug. 16, 2022, in connection with Indian Application No. 202127055213, 5 pages.

United States Patent and Trademark Office Trademark Registration—Charge Free Conversion Kit.†

Sigma Drilling Technologies, LLC, commercial website, Screenshots obtained Nov. 22, 2019; effective date Oct. 1, 2014—See Sigma Drilling Technologies "Terms & Conditions" final sentence.†

Hon. Amos L. Mazzant, III, Report on the Filing or Determination of an Action Regarding a Patent or Trademark Re: U.S. Appl. No. 61/878,174, filed Sep. 16, 2013, Justin Manley; U.S. Appl. No. 62/037,901, filed Aug. 14, 2014, Justin Manley; U.S. Appl. No. 14/846,872, filed Sep. 7, 2015, Justin Manley and William Garfield, Judgment Entered May 9, 2019; Case 4:17-cv-00450-ALM *Performance Pulsation Control, Inc.* v. *Sigma Drilling Technologies, LLC, Justin P. Manley, et al.* United States District Court, Eastern District of Texas, Sherman Division.†

\* cited by examiner
† cited by third party
‡ imported from a related application

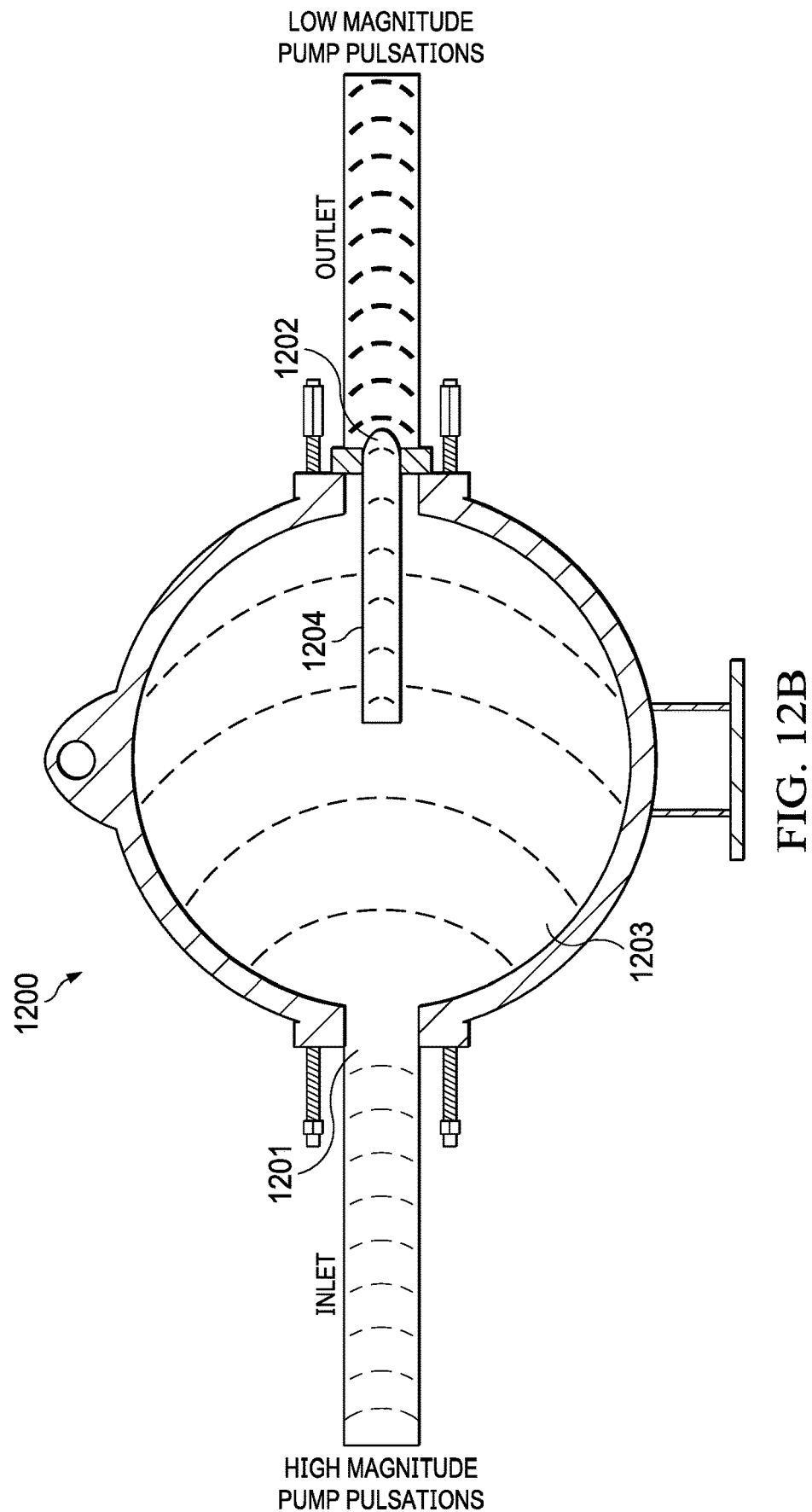

SYSTEM PULSATION DAMPENER DEVICE(S) SUBSTITUTING FOR PULSATION DAMPENERS UTILIZING COMPRESSION MATERIAL THEREIN

PRIORITY CLAIM

This application is a continuation-in-part of U.S. Non-Provisional patent application Ser. No. 16/157,952 filed Oct. 11, 2018 and entitled SYSTEM PULSATION DAMPENER DEVICE(S), and claims priority to U.S. Provisional Patent Application No. 62/577,567 filed Oct. 26, 2017 and entitled COMBINATION STANDPIPE MANIFOLD AND PULSATION DAMPENER DEVICE and U.S. Provisional Patent Application No. 62/635,374 filed Feb. 26, 2018 and entitled SYSTEM PULSATION DAMPENER DEVICE(S). The content of the above-identified patent documents is incorporated herein by reference.

TECHNICAL FIELD

The present application relates generally to the operation of reciprocating fluid transfer systems and, more specifically, to providing one or more pulsation control products and/or devices after fluid flow aggregation structures, such as between a standpipe manifold and a standpipe or after multi-flow fluid stream consolidation, and before connecting to a top drive or swivel in a drilling rig, and/or at other non-traditional locations for pulsation dampeners.

BACKGROUND

Pulsation control in fluid transfer systems is in constant need of improvement. Among the improvements desirable are reducing pulsation amplitudes from pumps to the downstream system and increasing flexibility in integration of pulsation dampeners with other elements of an overall pump system.

SUMMARY

A fluid delivery system includes a pulsation dampener coupled between a standpipe manifold and a standpipe, or within the standpipe, or after multi-flow fluid stream consolidation, or at other locations along the fluid flow path after the standpipe or consolidation but (preferably) before the fluid enters the top drive or swivel. Individually or in combination, these "system" pulsation dampener device(s) are situated in non-traditional locations along the fluid flow path but may be used together with a "main" or conventional pulsation dampener at the outlet of the mud pump, typically acting as supplementary pulsation dampening device(s). Alternatively, one or more system pulsation dampener device(s) may be used in lieu of a pulsation dampener located conventionally at the outlet of the mud pump. In a simple form, the system pulsation dampener device(s) may be an orifice with resistance (e.g., an orifice plate). Alternatively, the system pulsation dampener device(s) may be an orifice with a resistance, coupled with a fluid volume.

In some embodiments, the fluid delivery system includes a system pulsation dampener coupled between a standpipe manifold and a standpipe is provided. The system includes a fluid reservoir, a fluid pump, a manifold, a system pulsation dampener, and piping. The fluid reservoir stores a fluid used for a drilling procedure. The fluid pump pumps the fluid from the fluid reservoir through the fluid delivery system. The manifold is located downstream from the fluid pump, and receives and combines fluids from the one or more fluid pumps. The system pulsation dampener receives the combined fluid from the manifold, and dampens residual pulsations from the manifold. The piping receives fluid output from the system pulsation dampener, and transfers the fluid received from the system pulsation dampener further downstream.

In other embodiments, the fluid delivery system includes a system pulsation dampener coupled after the fittings combining multiple flows of fluid streams into a single stream is provided. The system includes fittings combining multiple fluid flow streams into a single flow stream, a system pulsation dampener, and piping. The fluid pump pumps the fluid from the fluid reservoir through the fluid delivery system. The fluid flow stream is combined using fittings located downstream from the fluid pump, which collectively receive and combine fluids from the one or more fluid pumps. The system pulsation dampener receives the combined fluid flow stream, and dampens residual pulsations. The piping receives fluid output from the system pulsation dampener, and transfers the fluid received from the system pulsation dampener further downstream.

In still other embodiments, the fluid delivery system includes one or more system pulsation dampeners in the fluid flow path within and/or after the standpipe or after the fittings combining fluid flow streams, and in some embodiments as close to the top drive or swivel of the drilling rig as possible, such as on the top drive or swivel or in or connected to the entry pipe for the top drive or swivel. These one or more system pulsation dampeners typically act as supplementary pulsation dampening devices, in addition to a main pulsation dampener at the outlet of the mud pump and/or a pulsation dampener between the standpipe manifold and the standpipe or after the fittings combining fluid flow streams. The system may therefore include some combination of: (a) a main pulsation dampener at the outlet of the mud pump; (b) a pulsation dampener between the standpipe manifold and the standpipe or after the fittings combining fluid flow streams; and (c) in embodiments with a standpipe and standpipe manifold, one or more pulsation dampeners in the fluid flow path within and/or after the standpipe.

In one advantageous embodiment, the system pulsation dampener obviates the need to recharge a gas-charged pulsation dampener or replace the compression material within commercially available, charge-free pulsation dampeners.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 12A and 12B are cutaway and diagrammatic illustrations, respectively, of a maintenance free, reactive system pulsation dampener in accordance with embodiments of the present disclosure.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged standpipe manifold dampener or system dampener that can be used to control or partially control pulsation amplitudes.

Reciprocating systems, such as reciprocating pump systems and similar equipment, operate in many types of cyclic hydraulic applications. For example, reciprocating mud pump systems are used to circulate the mud or drilling fluid on a drilling rig. Pressure peaks within the pumped fluid accelerate, with each pulsation, the deterioration of the pump, the pump's fluid end expendable parts, and equipment downstream from the pump, such as measurement equipment used to determine drilling parameters, and washpipe and washpipe packing. Failure to control such pressure peaks inevitably affect the operating performance and operational life of the pump, pump fluid end expendable parts and all upstream or downstream components. Pressure peaks may also interfere with instrument signal detection, such that failure to control pressure peaks may also affect the signal detection and/or quality of the signal detection in (for example) measurement while drilling operations.

Pulsation control equipment is typically placed immediately upstream or downstream from a reciprocating pump, often with a relative size and configuration proportional to the volume of desired fluid displacement per stroke of the pump and the maximum allotted magnitude of the pressure peaks that may be experienced by the pump system during each pulsation. Pulsation control equipment thus aids in reducing pump loads and minimizing pulsation amplitudes to the pump, the pump's fluid end expendable parts and to equipment upstream or downstream. As a result, pulsation control equipment increases the relative operating performance and life of the pump, the pump's fluid end expendable parts and any equipment upstream or downstream from the pump.

However, pulsations may be experienced further downstream from the mud pumps as well, as fluid travels through piping towards the intended destination. These pulsations may be exacerbated when the fluid need to be diverted down a different path, or when multiple streams of fluid need to be combined and redirected into a single stream. Most systems do not account for these downstream pulsations. These downstream pulsations can cause damage to downstream components and increased noise for downstream measurement instruments and sensors.

Figure 1:
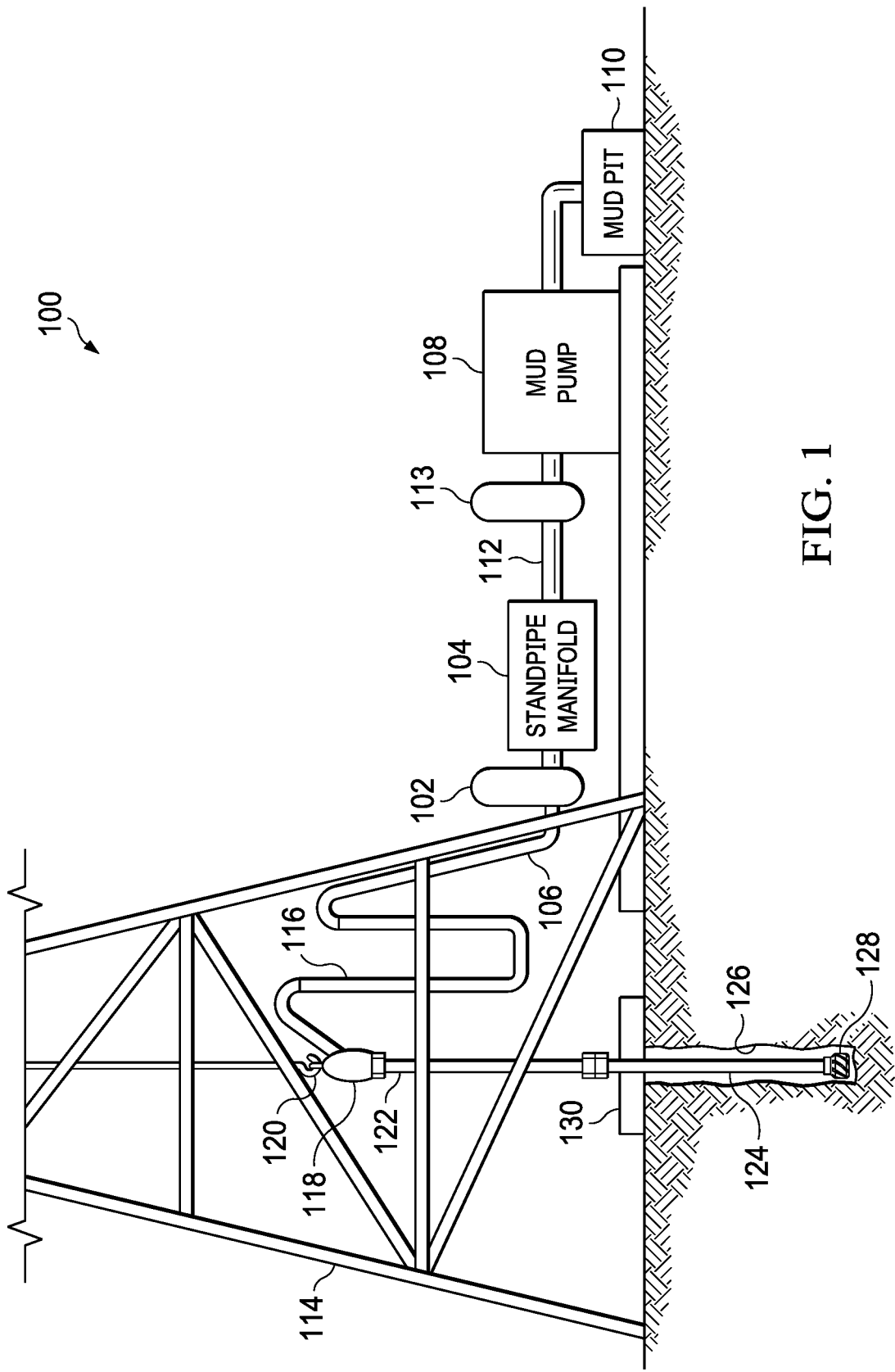
FIG. 1 illustrates a diagrammatic view of a drilling system including a pulsation dampener installed between a standpipe manifold and a standpipe according to various embodiments of the present disclosure.
Figure 2:
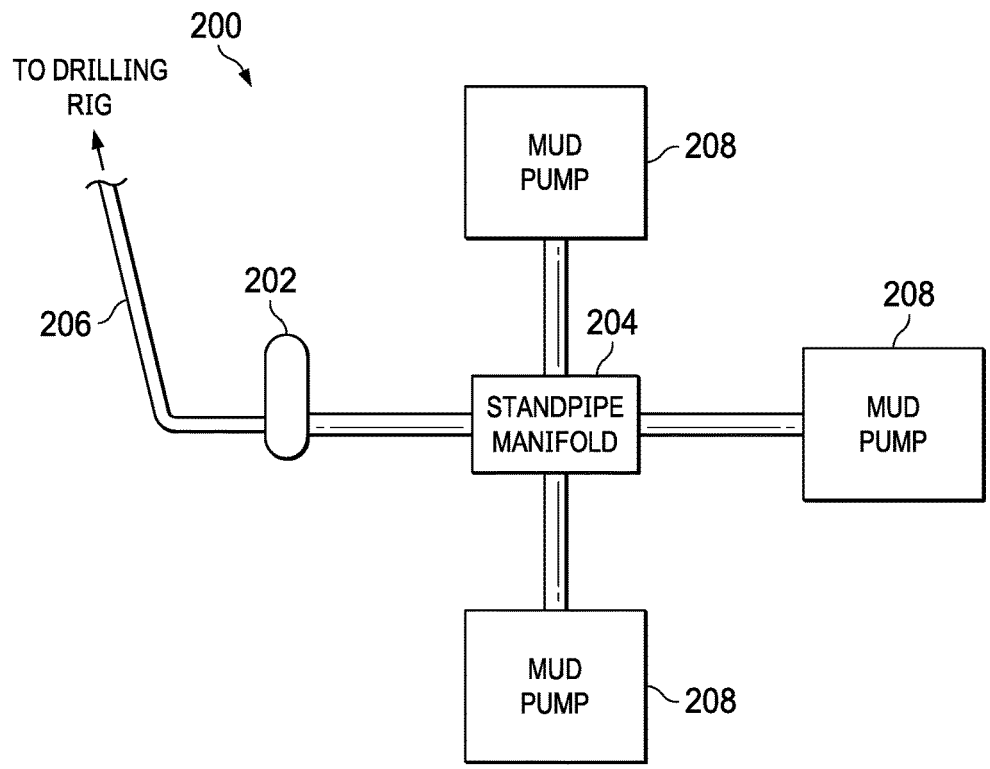
FIG. 2 illustrates a diagrammatic view of a portion of a system for fluid delivery, drilling, or both that includes a plurality of mud pumps according to various embodiments of the present disclosure, which may be used in embodiments of a drilling system that include a system pulsation dampener installed between a standpipe manifold and a standpipe as depicted in FIG. 1.
Figure 3:
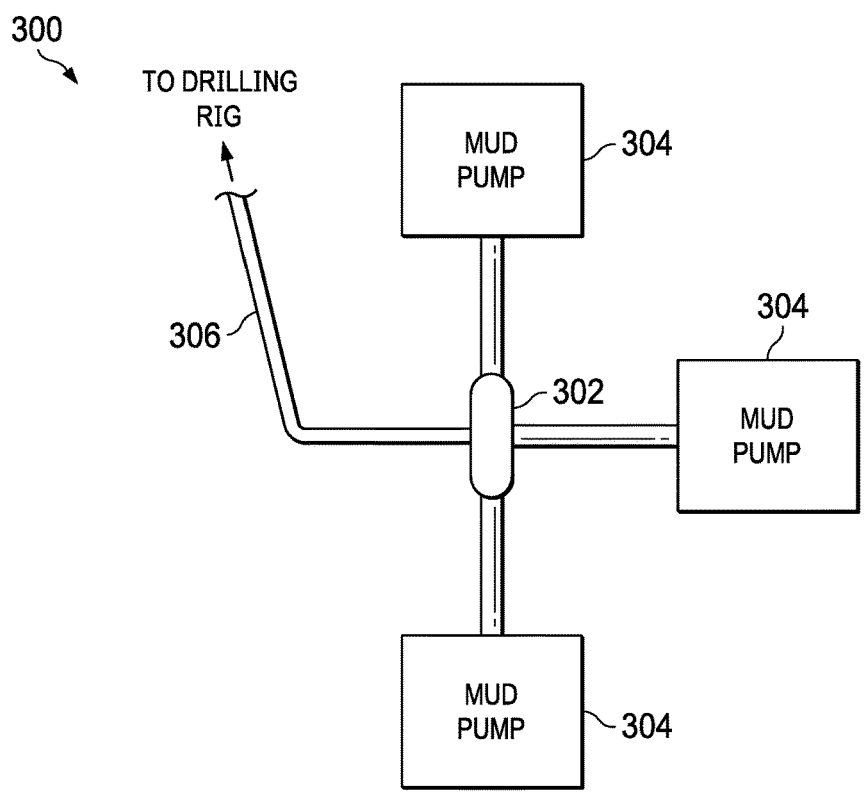
FIG. 3 illustrates a diagrammatic view of a portion of a system fluid delivery, drilling, or both including a combination standpipe manifold and pulsation dampener in one system device, the standpipe manifold system dampener according to various embodiments of the present disclosure, which may also be used in embodiments of a drilling system that include a system pulsation dampener installed between the mud pump(s) and a standpipe as depicted in FIG. 1.
Figure 4:
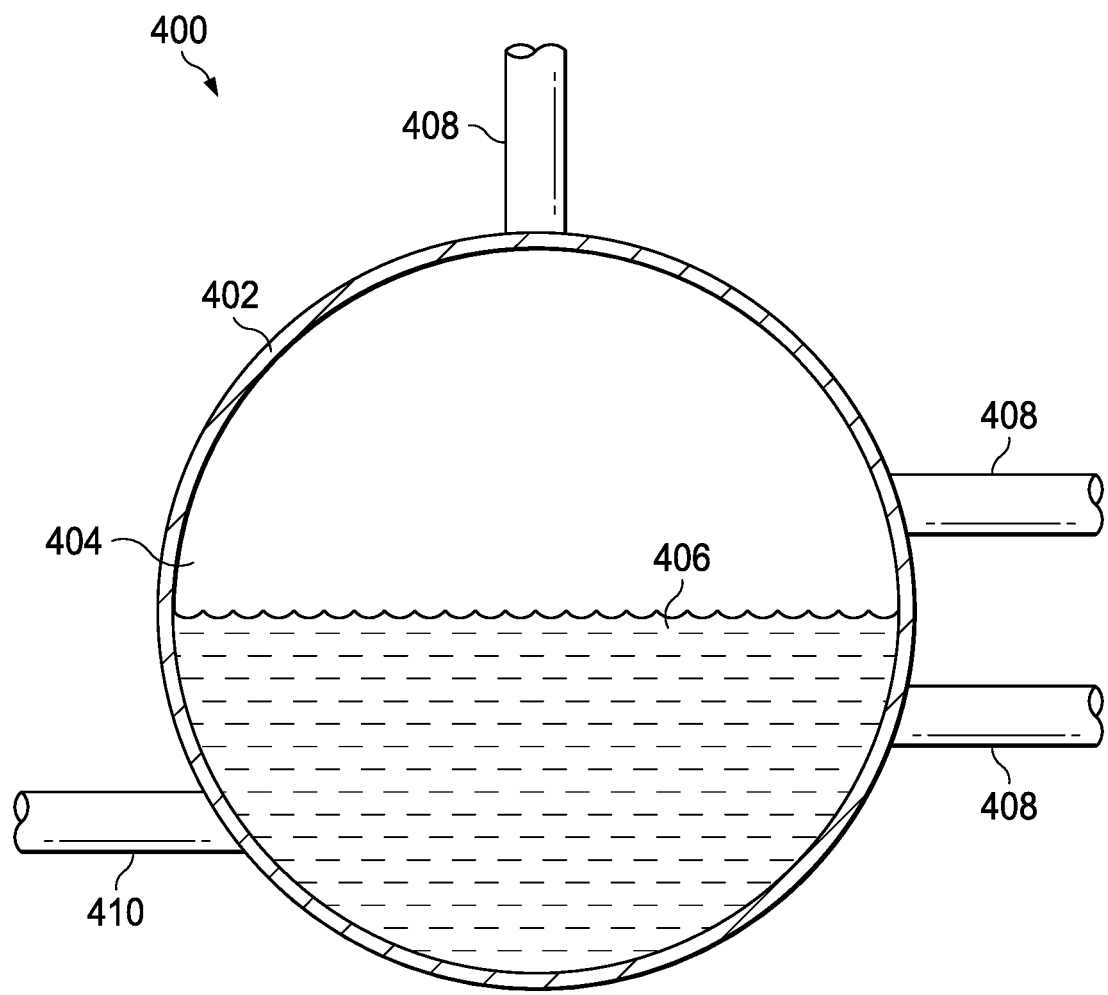
FIG. 4 illustrates one combination standpipe manifold and system pulsation dampener according to various embodiments of the present disclosure.
Figure 5:
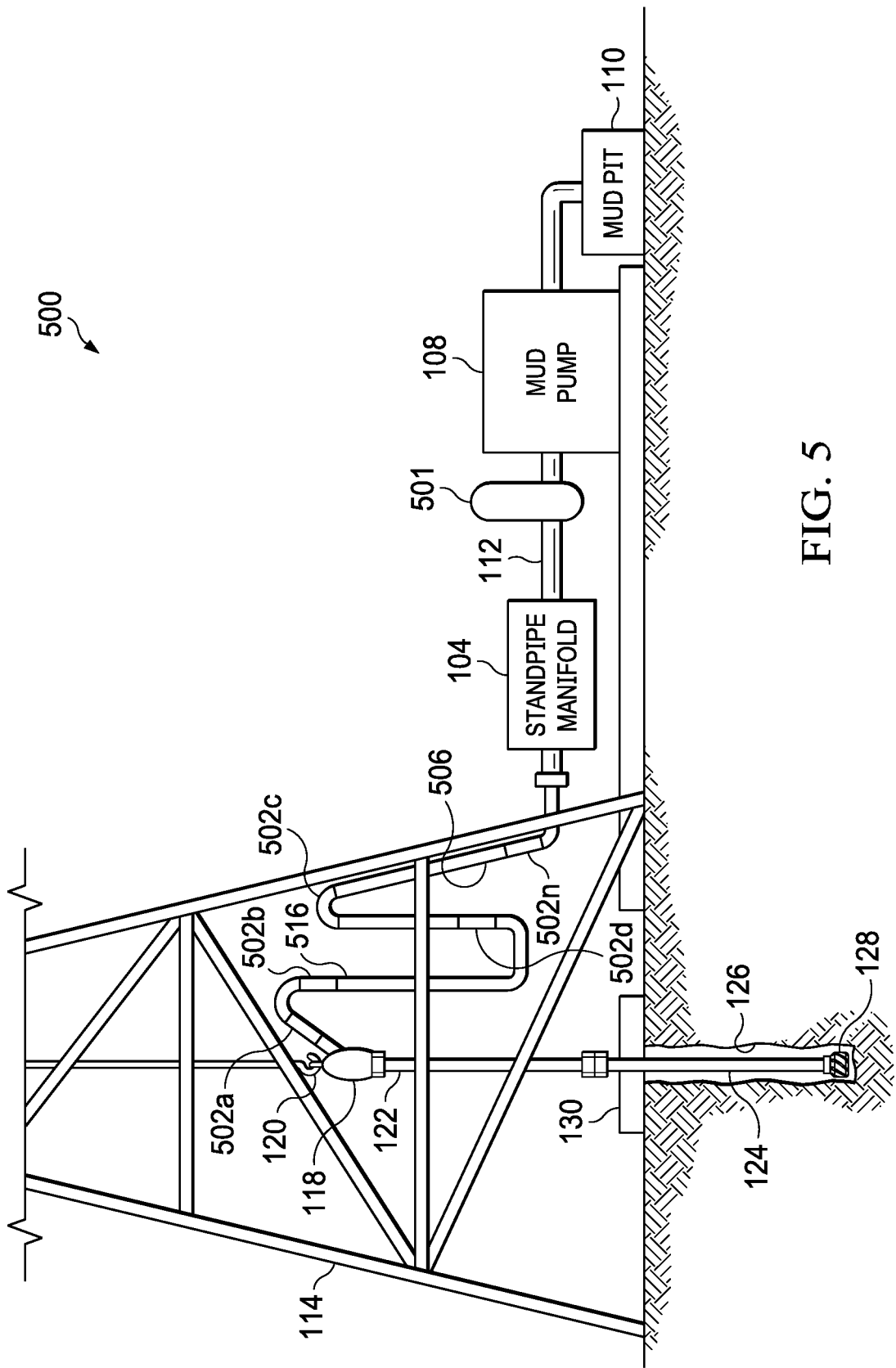
FIG. 5 is a diagrammatic view of a drilling system including an alternative pulsation dampener mechanism that may be installed in, proximate to, or downstream of a standpipe according to various embodiments of the present disclosure.
Figure 6A:
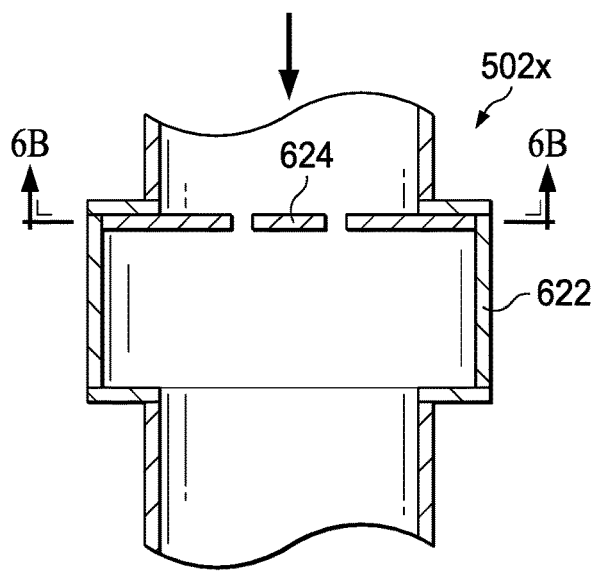
FIGS. 6A through 6E are enlarged diagrammatic views of various designs for system pulsation dampener device(s) implementing the pulsation dampening orifice assembly portion(s) of FIG. 5, used as system pulsation dampening device(s)
Figure 6B:
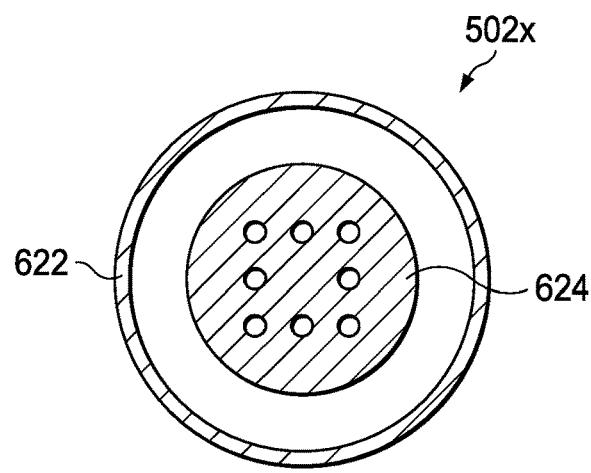
Figure 6C:
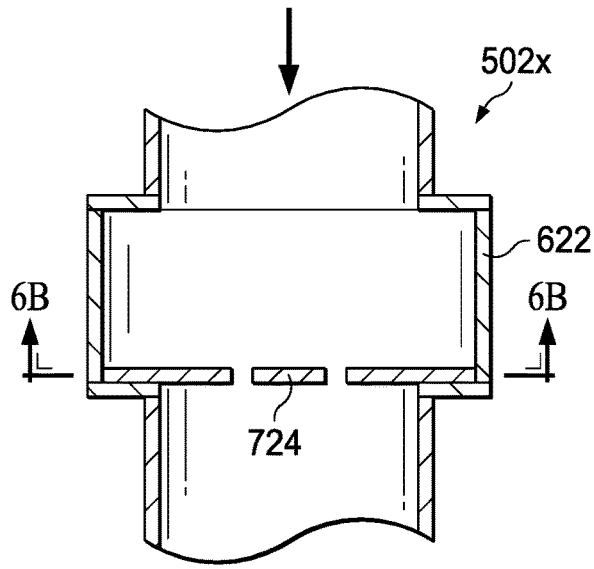
Figure 6D:
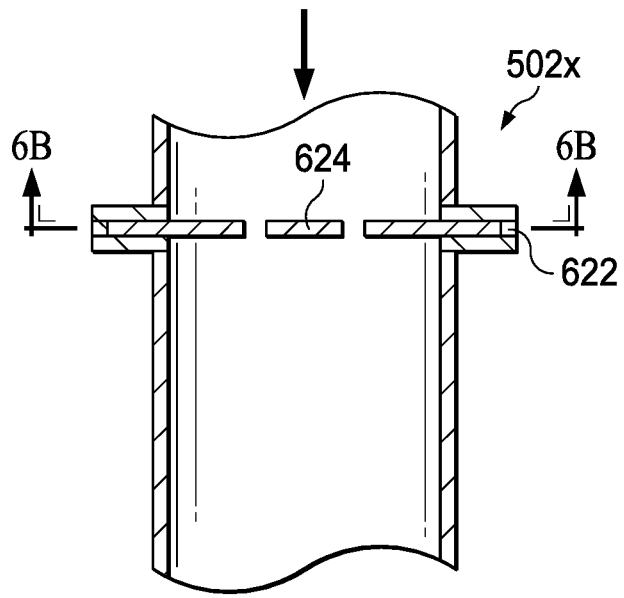
Figure 6E:
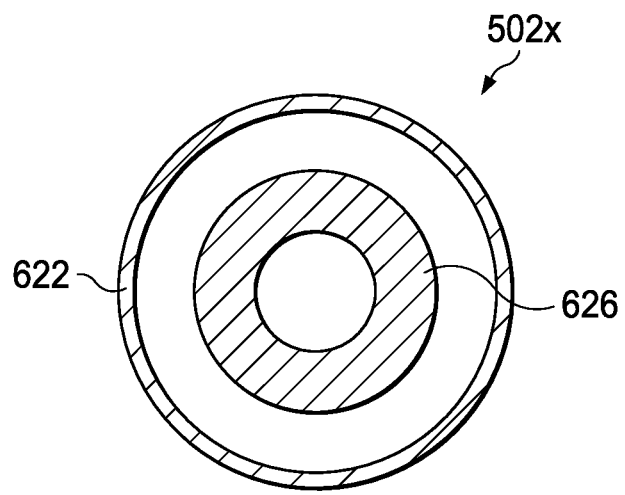
Figure 7:
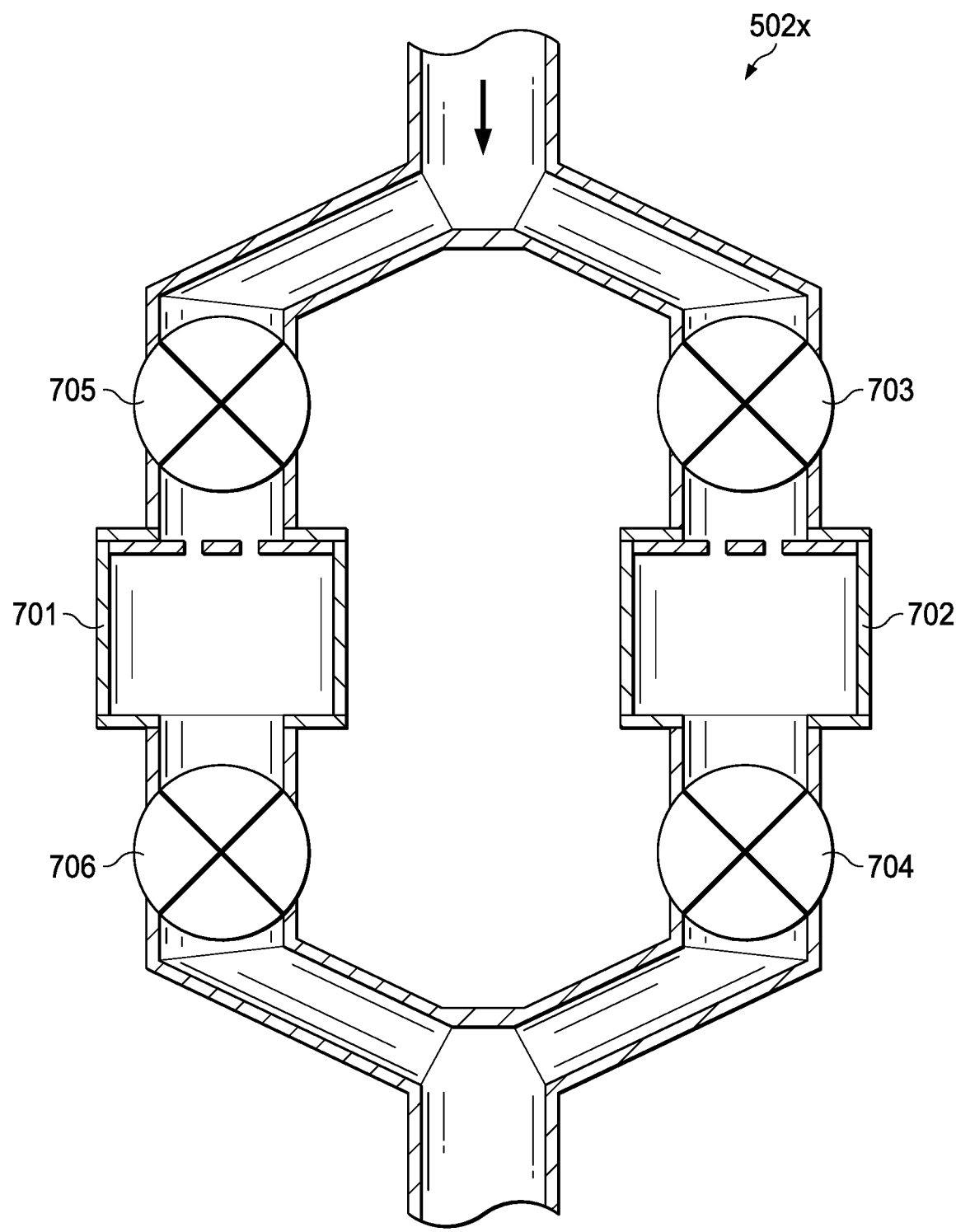
FIG. 7 is a diagrammatic view of an alternate design, with redundancy, for system pulsation dampener device(s) that may be installed in, proximate to, or downstream of a standpipe according to various embodiments of the present disclosure to implement the pulsation dampening orifice assembly portion(s) of FIG. 5.
Figure 8:
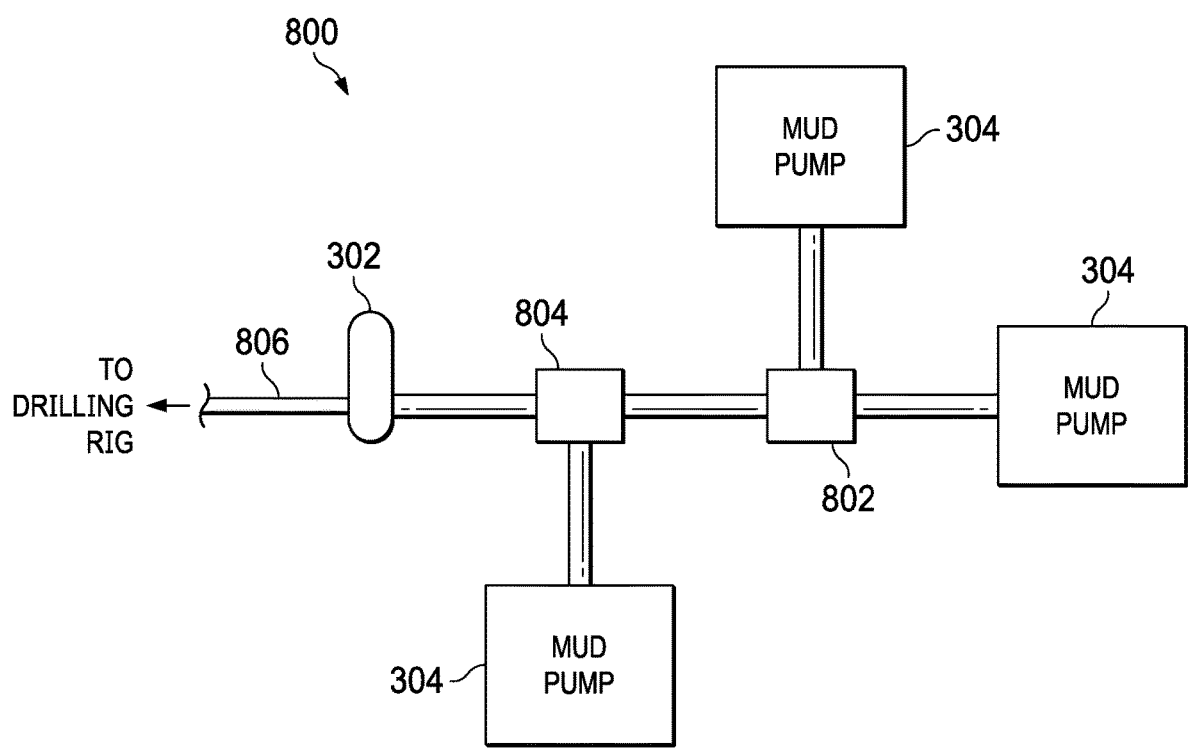
FIG. 8 illustrates a diagrammatic view of a fluid delivery or drilling system including fittings combining multiple fluid flow streams according to various embodiments of the present disclosure, which may also be used in embodiments of a drilling system that include a system pulsation dampener installed after the fittings combining multiple fluid flow streams.

As used herein, "system pulsation dampener" refers to a pulsation dampener installed between a standpipe manifold and a standpipe as illustrated by FIGS. 1 and 2, a combination standpipe manifold and pulsation dampener device as illustrated by FIG. 3, a pulse dampener manifold illustrated by FIG. 4, the orifice assembly pulsation dampening device(s) illustrated in FIGS. 5, 6 and 7, and the system pulsation control dampener located after the location at which outputs from multiple pumps are consolidated into one flow stream as shown in FIG. 8.

FIG. 1 illustrates a diagrammatic view of a drilling system 100 including a pulsation dampener 102 installed between a standpipe manifold 104 and a standpipe 106 according to various embodiments of the present disclosure. The embodiment of the drilling system 100 illustrated in FIG. 1 is for illustration only. FIG. 1 does not limit the scope of this disclosure to any particular implementation of a drilling system.

Referring now to FIG. 1, the drilling system 100 includes at least one pulsation dampener 102, at least one standpipe manifold 104, at least one standpipe 106, at least one mud pump 108, at least one mud pit 110, at least one discharge line 112, a conventionally located pulsation dampener 113 at the outlet of the mud pump 108, and at least one drilling rig 114. The drilling system 100 operates to pump mud or other fluids down a well currently being drilled to keep a drill bit 128 from overheating, provide lubrication to the drill bit, and remove rock cuttings to the surface.

A fluid pump or mud pump 108 may pump fluid or mud from a mud pit 110 through a discharge line 112 in the direction of a drilling rig 114. More than one mud pump 108 can be utilized in a drilling system 100 to continue drilling upon the failure of a single mud pump 108. A pulsation dampener 102 can also be installed on the discharge line 112 for each mud pump 108 to further reduce pulsations. The mud pit 110 can also reference a fluid reservoir, where the fluid reservoir stores a fluid used during a drilling process.

Conventionally, a pulsation dampener 113 is located along the discharge line 112, at the outlet of the mud pump 108 and before the standpipe manifold 104. The standpipe manifold 104 may be installed down the discharge line 112 and is attached to and/or coupled in fluid communication with the drilling rig 114. The standpipe manifold 104 may receive a plurality of different fluid streams from a plurality of mud pumps 108. The standpipe manifold 104 may then combine all of the fluid streams together to send a single fluid stream up the standpipe 106. Other functions traditionally performed by the standpipe manifold are to provide an auxiliary connection for a supplementary pump and, in systems with multiple standpipes providing operational redundancy in case of failure of one standpipe, to switch fluid flow paths from one standpipe to another. However, those skilled in the art understand that some systems dispense with the standpipe manifold, and simply bring the outlet flows of multiple mud pumps together in a single line somewhere near the mud pumps or downstream, with the combined flow then traveling in a single line to the substructure and upwards toward the standpipe.

When the fluid streams from multiple mud pumps are combined (in a standpipe manifold or without one), the pulsations in the resulting combined fluid flow can be enlarged based on the different pulsations of the mud pumps 108 being used. For example, the different types or sizes of mud pumps 108 can be used in a single drilling system 100, which would cause variations or pulsations in the fluid flow through the pipe. The mud pumps 108 could also be located at different distances from the standpipe manifold 104. The mud pumps 108 could begin at different times, operating off cycle from other mud pumps 108, or simply be operating at different stroke lengths. Any of the previous operating parameters would affect the flow of fluids or mud into the standpipe manifold 104 causing pulsations at the well.

The standpipe 106 may be installed on the drilling rig 114 and travel up the drilling rig 114 to provide the fluid stream through a rotary hose 116 connected to a swivel 118, the swivel 118 coupled to a rotary hook 120. The standpipe 106 receives discharge from the standpipe manifold, which includes the system pulsation dampener 102. The standpipe manifold 104 can include multiple discharges to the standpipe 106 in case of failure in part of the standpipe manifold 104 or associated pipeline.

The swivel 118 may serve as a passageway for the fluid stream into a kelly drive 122 (or just "kelly"). The kelly 122 connects to a drill string 124. The fluid passes through the kelly 122 and the drill string 124 down a bore hole 126 to a drill bit 128 disposed at a far end of the drill string 124. The kelly 122 is typically rotated by a rotary table 130. More recent systems may include atop drive to rotate the drill string 124 as an alternative to the rotary table and kelly drive, and the present disclosure is applicable to such top drive configurations as well.

In drilling systems, pulsation dampeners 113 can be installed near the mud pump 108 to reduce pump loads and minimize pulsation amplitudes from the mud pumps 108. However, as fluid is combined at the standpipe manifold 104 into a single stream and sent to the standpipe 106, significant energy and pulsation amplitudes may be created by the combining of the streams from the mud pumps 108 or transferred directly to the standpipe 106, which is then transferred to the rest of the system downstream described herein. The pulsation amplitudes produced may be greater as more mud pumps 108 are used to provide fluid reaching the standpipe manifold 104, as pulsations from multiple pipes receiving fluid from multiple mud pumps 108 come together and accumulate at the standpipe manifold, which are then transferred to the standpipe 106. These pulsations can cause wear and damage to components, including the connections near the swivel 118, kelly 122, and other components such as a wash pipe and wash pipe packing (seals) (both not shown) that serves as a conduit for fluid through the swivel 118. Instruments used for monitoring and measuring operations while drilling can also be affected by the residual pulsations from the mud pump 108. Even the smallest pulsations from the standpipe manifold can affect the measurement readings.

An additional, system pulsation dampener 102 is thus installed between the standpipe manifold 104 and the standpipe 106 to reduce residual pulsations from the mud pump 108 and to reduce pulsations from combining of fluid streams at the standpipe manifold 104. System pulsation dampener 102 reduces the pulsations and, like the conventional pulsation dampener 113 and all other system pulsation dampener device(s) described herein, may produce an internal or external pressure drop within the passing fluid in order to further reduced higher frequency pulsations and enhance the overall dampening performance. In some embodiments, the system pulsation dampener 102 may be a gas charged dampener. The system pulsation dampener 102, like the conventional pulsation dampener 113 and all other system pulsation dampener device(s) described herein, may a hydro-pneumatic or gas-charged pressure vessel containing compressed air or nitrogen and a bladder (or bellows) that separates the process fluid from the gas charge. In some embodiments, the system pulsation dampener 102, like the conventional pulsation dampener 113 and all other system pulsation dampener device(s) described herein, may be a ball-type or cylindrical-type flow-through dampener. In some embodiments, reactive dampeners may be used that rely on compressibility of the process fluid contained within dampener enclosure and a resistance device fitted with or into the pulsation dampener to dampen pump pulsations.

The system pulsation dampener 102 may be installed to the standpipe manifold 104 via a hose connection. The system pulsation dampener 102 may have a flanged outlet connection, and a flange to hammer union adapter may be used to connect the pulsation dampener 102 to the standpipe manifold 104. The system pulsation dampener 102 may also connect to the standpipe 106 via a hosed connection.

The system pulsations dampener 102 installed before the standpipe 106 reduces both low and high frequency pulsation magnitudes to allow the wash pipe and packing, as well as other component, to last longer. In addition, the system pulsation dampener 102 reduces noise and pulsation levels to allow for easier signal detection by the Measurements While Drilling (MWD) and Logging While Drilling (LWD) contractor located on the drilling rig 114. The system pulsation dampener 102 also assists with reduced interference with downhole instruments that may pick up the residual pulsations and that skew detections and generated data from the downhole instruments.

FIG. 2 illustrates a diagrammatic view of a fluid delivery or drilling system 200 including a plurality of mud pumps 208 according to various embodiments of the present disclosure, which may be used in embodiments of a drilling system 100 that include a system pulsation dampener 102 installed between a standpipe manifold 104 and a standpipe 106 as depicted in FIG. 1. That is, except for replacement of the components in FIG. 1 with their counterparts, depicted in FIG. 2, the remainder of the drilling system for embodiments in accordance with FIG. 2 may conform to the additional structures depicted in FIG. 1. The embodiment of the drilling system 200 illustrated in FIG. 2 is for illustration only. FIG. 2 does not limit the scope of this disclosure to any particular implementation of a drilling system.

Referring now to FIG. 2, the drilling and/or fluid delivery system portion 200 for fluid delivery, drilling, or both that includes at least one system pulsation dampener 202, at least one standpipe manifold 204, at least one standpipe 206, and a plurality of mud pumps 208. The components of drilling system portion 200 can be used in place of the similar components of drilling system 100 illustrated in FIG. 1.

A system pulsation dampener 202 is installed between a standpipe manifold 204 and a standpipe 206. A plurality of mud pumps 208 may transfer fluid to a standpipe manifold 204 simultaneously, creating vibrations at the standpipe manifold 204. The pulsation dampener 202 may be installed in a similar manner as that described herein with respect to pulsation dampener 102, serving to alleviate pulsations generated by the plurality of mud pumps 208 as fluid enters and intersects within the standpipe manifold 204 and is combined into a single outlet stream.

FIG. 3 illustrates a diagrammatic view of a portion 300 of a system for fluid delivery, drilling, or both including a combination standpipe manifold and pulsation dampener device 302 according to various embodiments of the present disclosure, which may also be used in embodiments of a drilling system 100 that include a pulsation dampener 102 installed between the mud pump(s) and a standpipe as depicted in FIG. 1. That is, except for replacement of the components in FIG. 1 with their counterparts, depicted in FIG. 3, the remainder of the drilling system for embodiments in accordance with FIG. 3 may conform to the additional structures depicted in FIG. 1. The embodiment of the drilling system 300 illustrated in FIG. 3 is for illustration only. FIG. 3 does not limit the scope of this disclosure to any particular implementation of a drilling system.

Referring now to FIG. 3, the drilling and/or fluid delivery system portion 300 includes at least one combination standpipe manifold and pulsation dampener device 302, a plurality of mud pumps 304, at least one standpipe 306.

Standpipe manifolds may increase pulsations experienced by a drilling system due to standpipe manifolds typically having connections or piping that receives fluid from multiple directions from different mud pumps. Standpipe manifolds often have angled turns that each fluid stream must travel through before the standpipe manifold combines the disparate streams into a single stream. As the fluid enters the manifold and is transferred through the turns of the standpipe manifold, additional vibrations may be created.

The combination standpipe manifold and pulsation dampener device 302 can be used instead of a standpipe manifold. Instead of diverting the separate fluid streams into a single stream with hard turns, the fluids can be received and manipulated within the body of the combination standpipe manifold and pulsation dampener device 302. Pulsation dampeners often have a volume of space, or reservoir, within the dampener where a certain amount of fluid may accumulate and pulsations are reduced before moving out of the pulsation dampener. The combination standpipe manifold and pulsation dampener device 302 may receive separate fluid streams from a plurality of mud pumps 304. The combination standpipe manifold and pulsation dampener device 302 may have piping mounted on the exterior of surface of the combination standpipe manifold and pulsation dampener device 302. In the case of a ball-type or cylindrical-type pulsation dampener, the piping may be mounted at select place on the spherical or cylindrical body of the pulsation dampener. Fluid received by the combination standpipe manifold and pulsation dampener device 302 may be deposited into the interior volume of the combination standpipe manifold and pulsation dampener device 302 and fluid within the interior volume of the combination standpipe manifold and pulsation dampener device 302 would exit the combination standpipe manifold and pulsation dampener device 302 to travel to the standpipe 306. The combination standpipe manifold and pulsation dampener device 302 can align the different received fluids to control the pulsations to be reduced in the combination, such as by creating a rotation within a chamber.

Since the combination standpipe manifold and pulsation dampener device 302 includes an interior volume, the problems of using a standpipe manifold can be avoided. The combination standpipe manifold and pulsation dampener device 302 does not have turns like a standpipe manifold, reducing the vibrations created as the separate streams intersect, and the combination standpipe manifold and pulsation dampener device 302 also provides pulsation dampening effects as it receives the separate fluid streams. The separate fluid streams can thus be combined within the volume of the combination standpipe manifold and pulsation dampener device 302 and then the single combined stream may exit the combination standpipe manifold and system pulsation dampener device 302 to travel to the standpipe 306 with a reduced or minimal energy being transferred to the standpipe 306 and to the rest of the downstream components.

FIG. 4 illustrates a combination standpipe manifold and pulsation dampener device 400 according to various embodiments of the present disclosure, which may be used in embodiments of a drilling system 100 that include a pulsation dampener 102 installed between the mud pump(s) and a standpipe as depicted in FIGS. 1 through 3 or in embodiments of a drilling system 100 that include a pulsation dampener 302 installed after fittings combining multiple fluid flow streams as depicted in FIG. 8. The embodiment of the combination standpipe manifold and pulsation dampener device 400 illustrated in FIG. 4 is for illustration only. FIG. 4 does not limit the scope of this disclosure to any particular implementation of a pulsation dampener or pulsation dampening method.

Referring now to FIG. 4, the combination standpipe manifold and pulsation dampener device 400 may be used in the systems 100, 200, and 300 described herein. The pulse dampener manifold includes a body 402. The body 402 illustrated in FIG. 4 is a spherical or cylindrical body according to various pulse dampeners having a ball-type or cylindrical-type body. However, different body shapes may be used to allow for different pulsation dampener body shapes, such as that shown in FIGS. 1-3.

The pulsation dampener manifold 400 may also include a reservoir 404 within an interior of the body 402. The reservoir 404 may collect a volume of fluid 406 from mud or fluid pumps residing upstream, through a plurality of upstream connections 408, in a fluid delivery or drilling system, such as those described with respect to FIGS. 1-3. The fluid received from each of the upstream connections 408 are combined as the volume of fluid 406. At least a portion of the volume of fluid 406 may then exit the pulse dampener manifold 400 as single fluid stream through a downstream connection 410. The combination standpipe manifold and pulsation dampener device 400 thus may fully replace a standpipe manifold, reducing the vibrations created from multiple fluid streams traveling through a standpipe manifold, and providing pulsation dampening for all streams entering the combination standpipe manifold and pulsation dampener device 400.

FIG. 5 is a diagrammatic view of a drilling system including an alternative system pulsation dampener mechanism(s) that may be installed in, proximate to, or downstream of a standpipe according to various embodiments of the present disclosure. The embodiment of the drilling system 500 illustrated in FIG. 5 is for illustration only. FIG. 5 does not limit the scope of this disclosure to any particular implementation of a drilling system. Although FIG. 5 does not depict a conventional pulsation dampener located at the output of the mud pump(s) or a system pulsation dampener between the standpipe manifold and the standpipe, those skilled in the art will recognize that one or more of the system pulsation dampener(s) diagrammatically depicted in FIG. 5 may be used either without such pulsation dampeners, with either of the conventional or system pulsation dampeners described above, or with both such conventional and system pulsation dampeners.

In the system of FIG. 5, pulsation dampening is either provided or enhanced by one of several different types of orifice designs positioned at one or multiple locations in or near the standpipe 506 or in the fluid flow path after the standpipe. The one or more orifice assemblies 502a, 502b, 502c, 502d, . . . , 502n that each comprises system pulsation dampening device(s) may be located at different points within the fluid flow path. The pulsation dampening orifice assembly may be located within or connected to the entry pipe for the top drive or swivel (depending on the type used by any given rig) as illustrated by orifice assembly 502a. The pulsation dampening orifice assembly may be located in between the hose 516 and the end of the entry pipe for the top drive or swivel as illustrated by orifice assembly 502b. The pulsation dampening orifice assembly may be located at a point just past the standpipe 506, in between the end of the standpipe 506 and the beginning of the hose 516 that connects the standpipe 506 to the top drive or swivel (depending on the type used by any given rig) as illustrated by orifice assembly 502c. Alternatively, the pulsation dampening orifice assembly may be located further along the hose/piping system, as illustrated by orifice assembly 502d. In still another alternative, the pulsation dampening orifice assembly may be located in the standpipe 506 located on the side of the derrick, possibly at or near one end of the standpipe 506 (although it may be positioned anywhere along the length of the standpipe 506), as illustrated by orifice assembly 502n. A single pulsation dampening orifice assembly may be employed, or multiple pulsation dampening orifice assemblies may be used at different locations along the fluid flow path, including one in each of the locations depicted in FIG. 5 or multiple pulsation dampening orifice assemblies within the top drive or swivel entry pipe (in the region of orifice assembly 502a), between the hose and the top drive or swivel entry pipe (in the region of orifice assembly 502b), between the standpipe 506 and the hose 516 (in the region of orifice assembly 502c), multiple pulsation dampening orifice assemblies in the hose 516 (in the region of orifice assembly 502d), and/or multiple pulsation dampening orifice assemblies in the standpipe 506 (in the region of orifice assembly 502n). Those skilled in the art will recognize that various permutations of the number and location of pulsation dampening orifice assemblies may be suited to different applications. Pulsation dampening orifice assemblies may also be positioned at other locations than those shown in FIG. 5, such as at the end (outlet) of the standpipe or at the connection to the swivel or top drive for the hose connected to the standpipe. As noted above, each pulsation dampening orifice assembly may produce an internal or external pressure drop in fluid passed, to enhance dampening of higher frequency pulsations. These orifice assemblies may or may not include liquid volumes to further enhance performance.

Figure 10A:
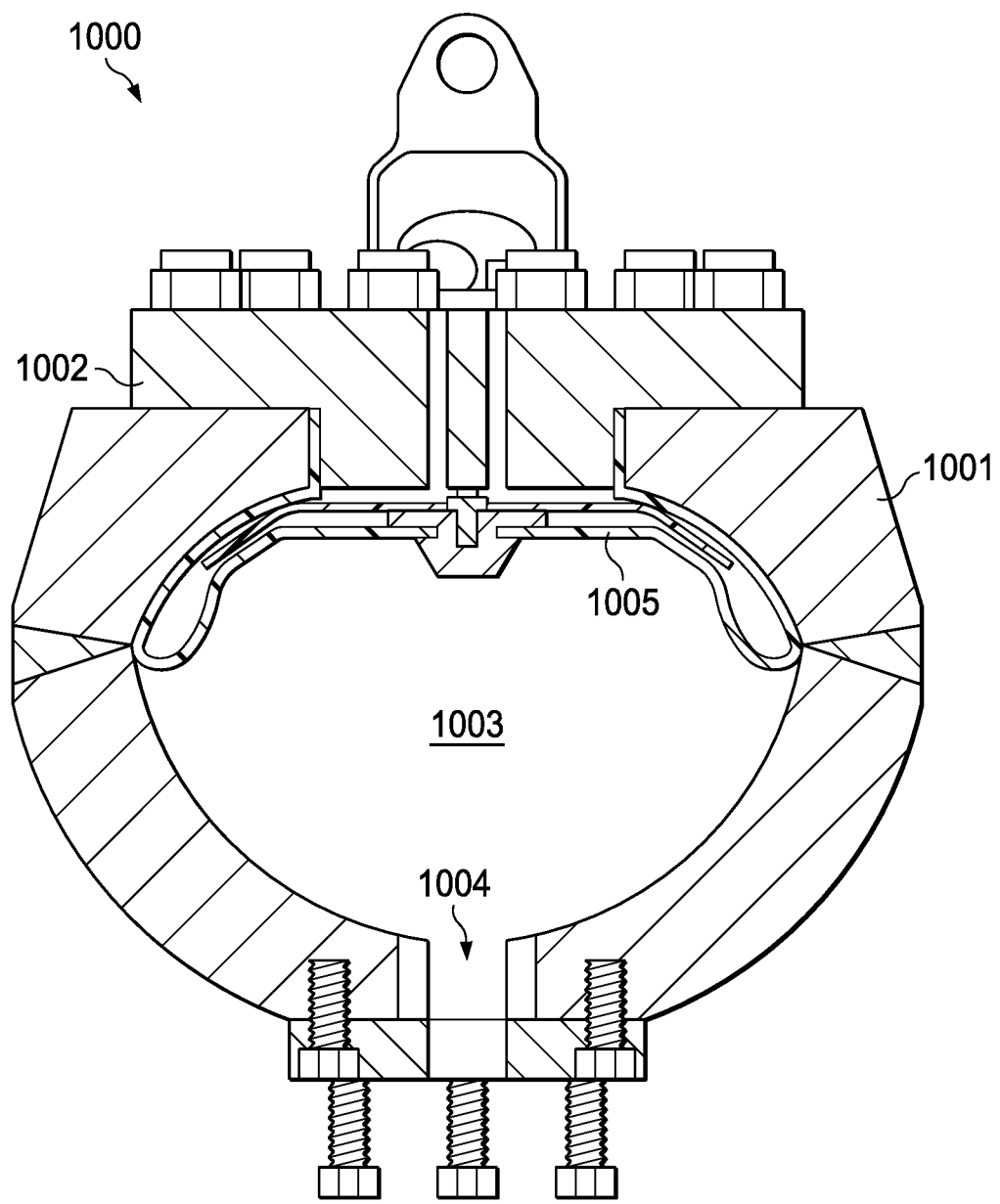
FIGS. 10A through 10C depict a gas-charged pulsation dampener.
Figure 10B:
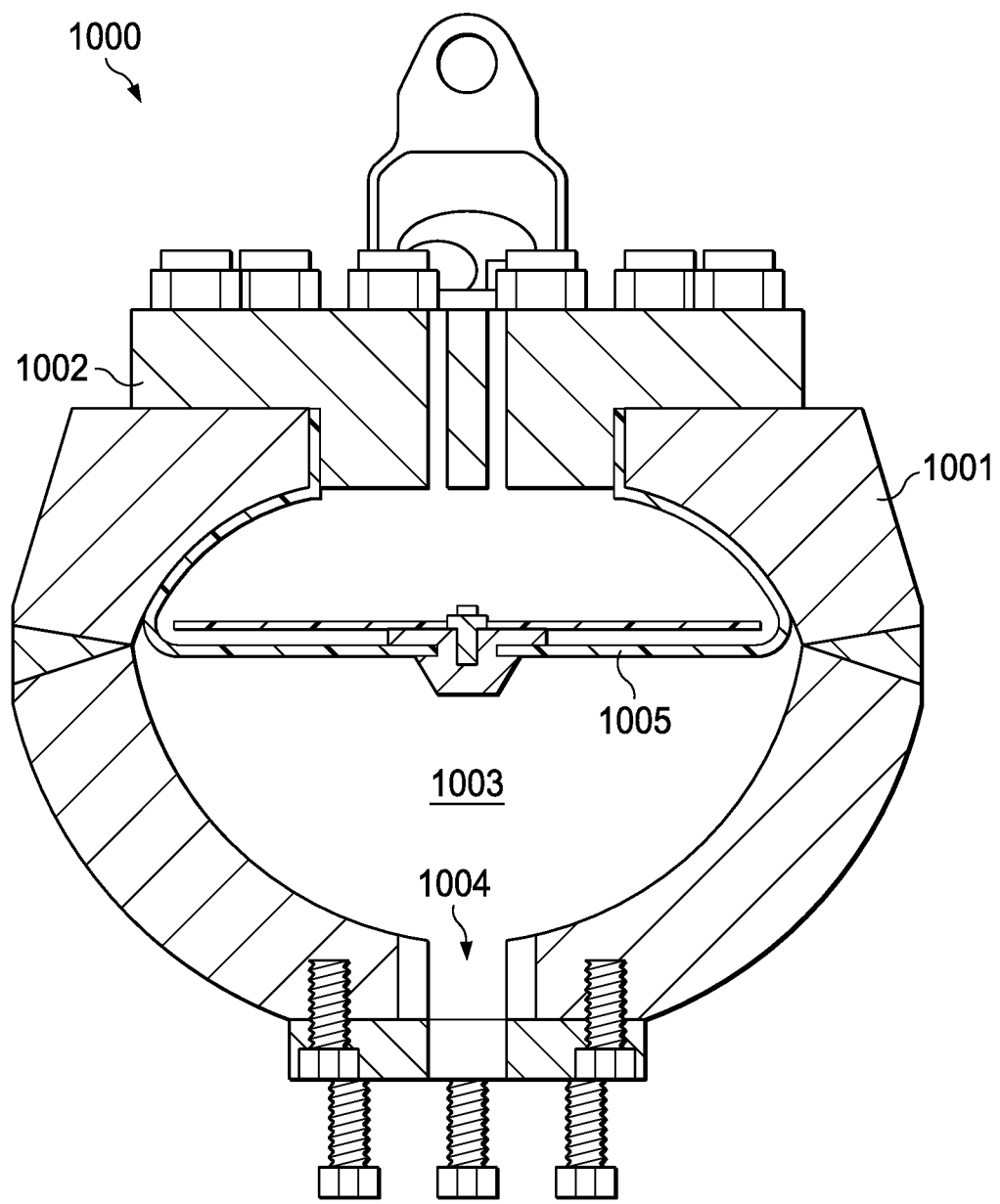
Figure 10C:
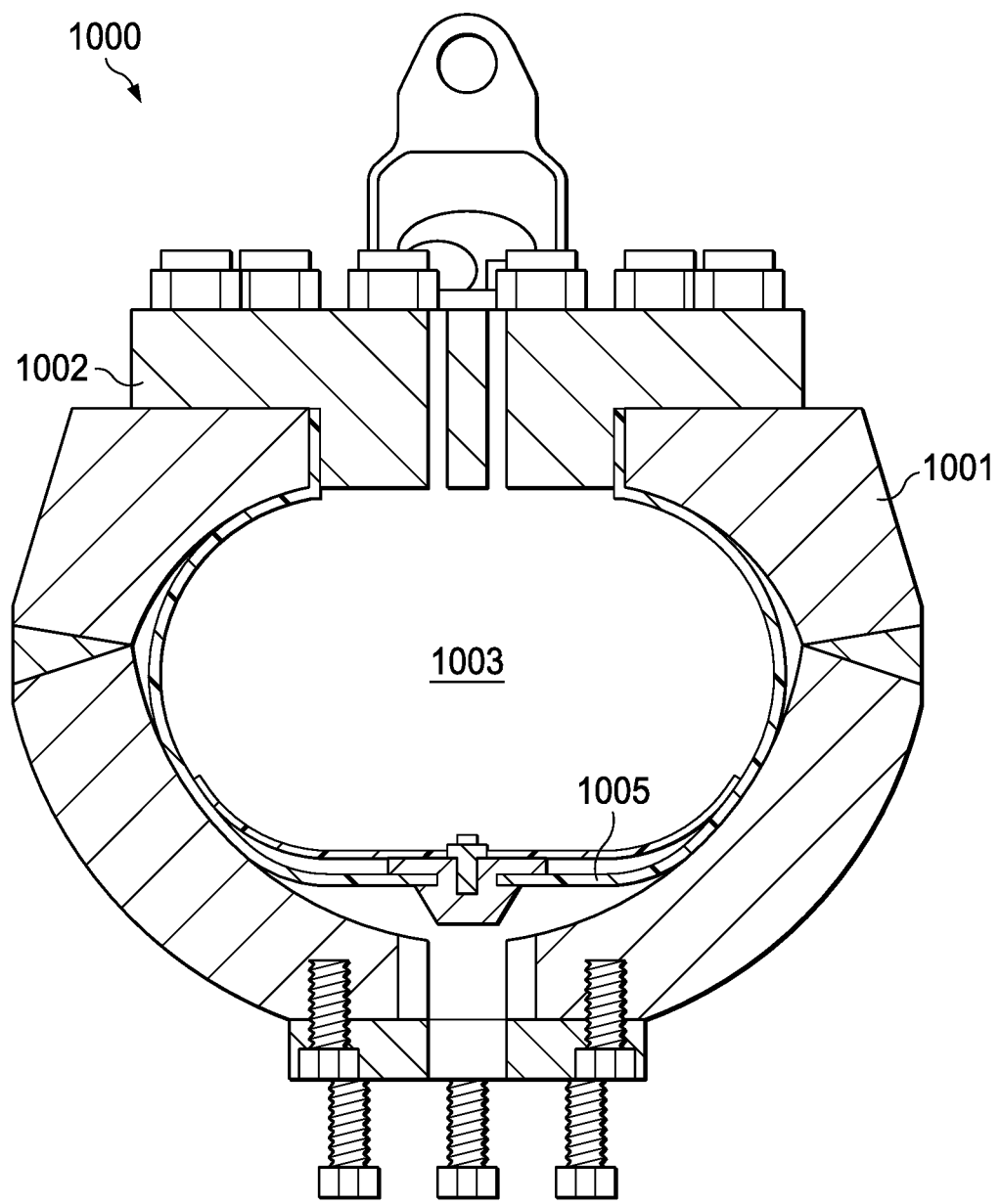

In one advantageous embodiment, the system pulsation dampener obviates the need to recharge a gas-charged pulsation dampener or replace the compression material within commercially available, charge-free pulsation dampeners. The system 500 retains at least the housing 1001 and cover 1002 of a gas-charged pulsation dampener 501 of the type depicted in FIGS. 10A through 10C. Notably, gas-charged pulsation dampeners typically are positioned above the piping through which pumped fluid passes using a cross, although not shown that way for system pulsation dampener 501 in FIG. 5. Cross-sections of a gas-charged pulsation dampener are depicted in FIGS. 10A through 10C. As depicted in FIG. 10A, the gas-charged pulsation dampener 1000 includes a housing body 1001 having an upper opening receiving and sealed by a cover 1002, which combine to form an internal cavity 1003 connected to pump system fluid piping (not shown) via a lower opening 1004. A flexible internal bladder 1005 within the internal cavity 1003 is filled with a compressible gas. Fluid from the connected piping enters and/or leaves the cavity 2003 via the lower opening 1004. The pressure of that fluid and the pressure of the compressible gas within the bladder 1005 will cause the lower surface of the bladder 1005, which is in contact with the pump system fluid, to shift and the volume occupied by the gas within the bladder 1005 to change. High pump fluid pressure will cause the bladder 1005 and the gas therein to be substantially compressed into a smaller volume, while mid-range pressure, or transition from high pressure to low pressure, will cause the bladder and its gas to expand into a larger volume and low fluid pressure will allow the bladder 1005 and its gas to expand essentially to a maximum volume allowed by the internal cavity 1003 of the housing body 1001 and cover 1002. The compressed gas within the bladder 1005 thus acts to absorb pressure pulses within the pump fluid and reduce the peak pressure that may occur. However, the compressed gas must be periodically (e.g., monthly, bi-monthly, quarterly or semi-annually) recharged. Referring back to FIG. 5, instead of re-charging the bladder 1005, the bladder 1005 is simply removed. One or more system pulsation dampener(s) are installed at the location(s) and in the manner discussed above, obviating the need for the gas-charged pulsation dampener 501 and further maintenance thereof. In many if not most instances, pulsation dampening performance can be improved by that substitution.

Figure 11A:
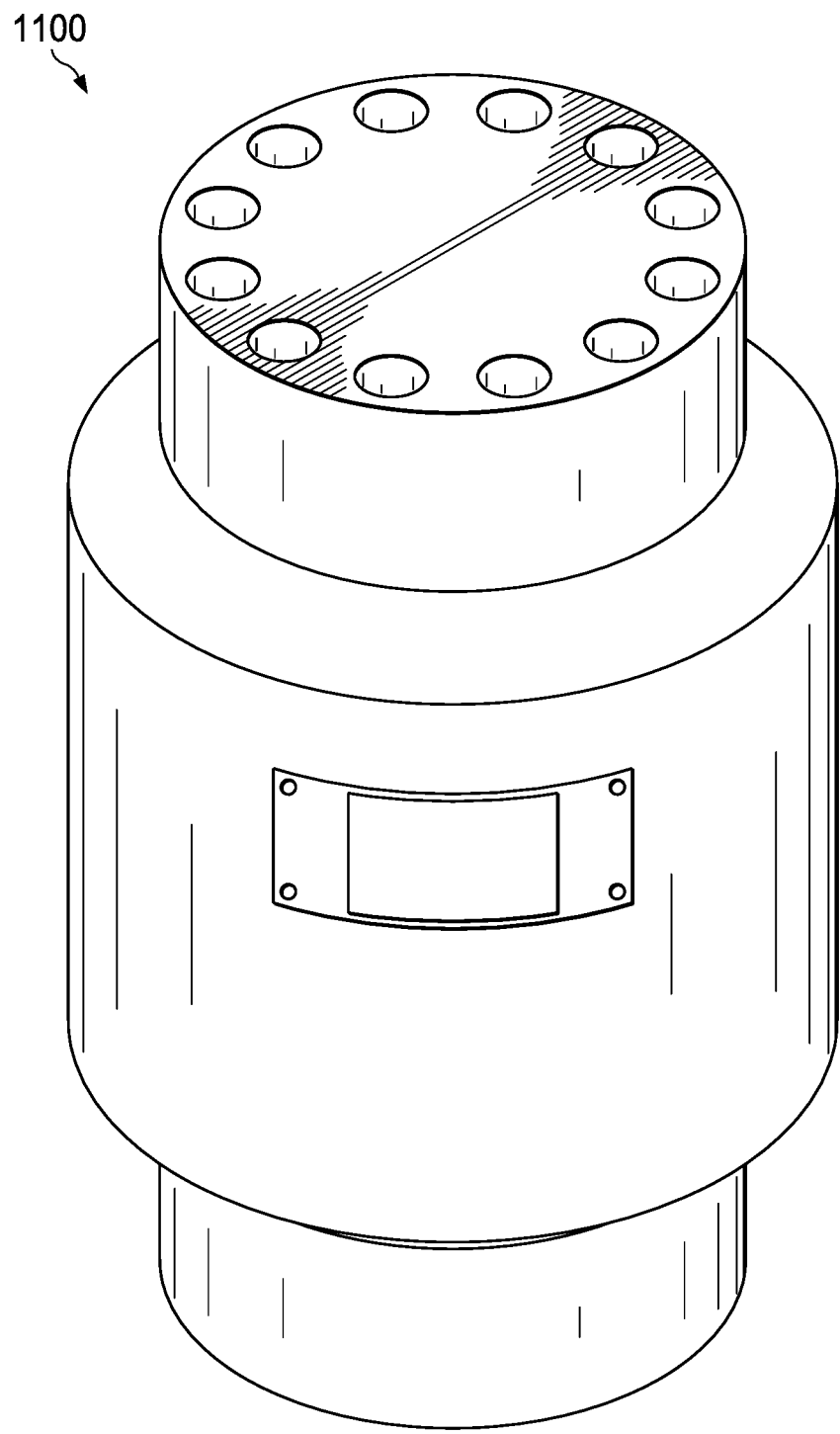
FIGS. 11A and 11B depict components of a commercially-available charge-free pulsation dampener.
Figure 11B:
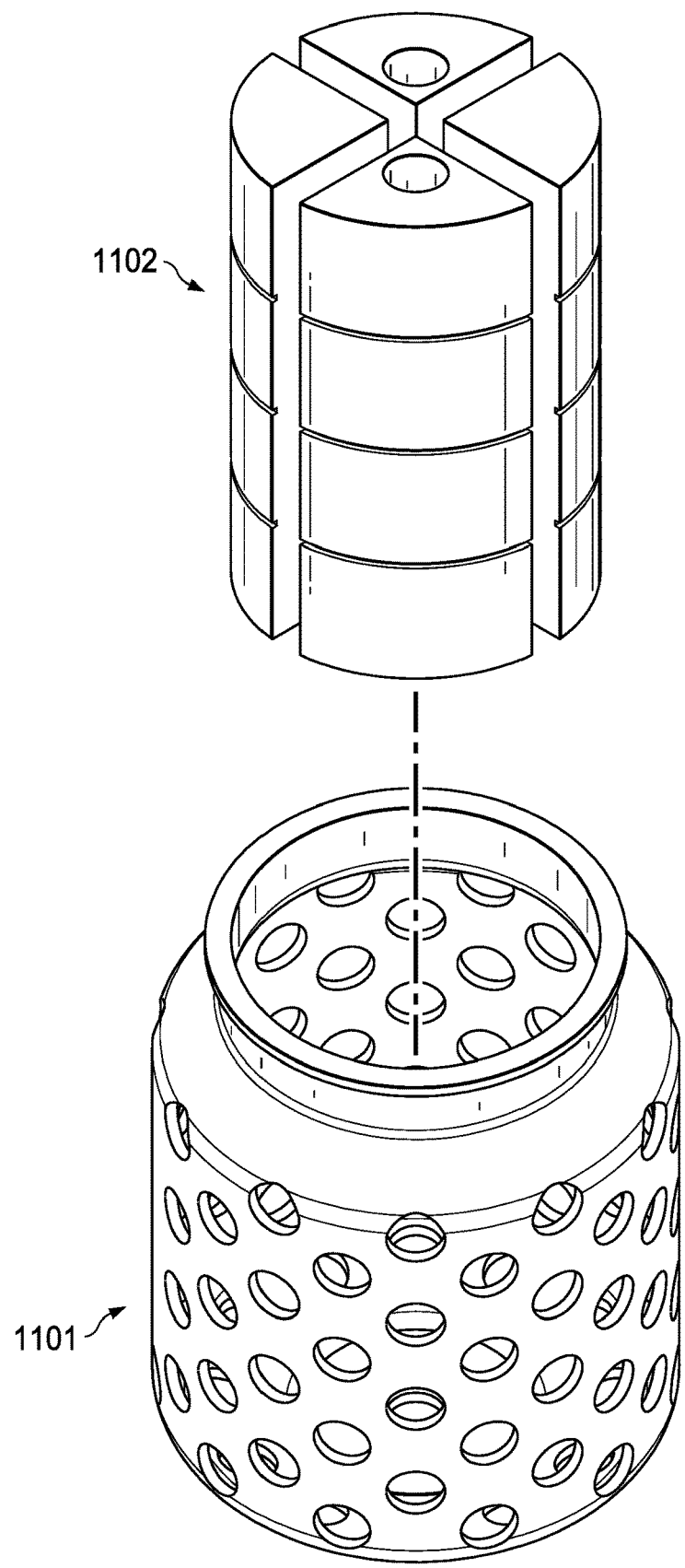

Alternatively, the system 500 retains at least the housing 1001 of the commercially-available, charge-free pulsation dampener 501 of the type depicted in FIGS. 11A and 11B. Again, charge-free pulsation dampeners typically are positioned above the flow line through which pumped fluid passes, although not shown that way for system pulsation dampener 501 in FIG. 5. Charge-free pulsation dampeners are often not as effective at attenuating pressure pulsations as gas-charged pulsation dampeners. The components for commercially available charge-free pulsation dampeners are depicted in FIGS. 11A and 11B. The pulsation dampener depicted in FIGS. 11A and 11B does not use a gas-charged bladder. As depicted in FIG. 11A, the charge-free pulsation dampener includes a housing 1100. The housing has a removable top portion with inlets and outlets for fluid passage into and out of the housing. A cage 1101 depicted (twice) in FIG. 11B is suspended within the housing and has an upper lip that is sealed against an interior of the housing 1100. The cage 1101 includes an open top together with openings through the sidewall and bottom surfaces thereof (hence forming a "cage" or basket). The cage 1101 holds compression material 1102 within an interior of the cage. The compression material in the example shown comprises a layered system of compression disks each segmented into four quarter-round wedges. As fluid enters the pulsation dampener housing 1100 and passes through the open top and/or the openings in the sidewall and bottom surface of the cage 1101, the fluid is distributed through the compression material with the pump system operating pressure applied across the various surfaces of the compression material, causing the compression material to compress under pressure and thereby attenuate pressure spikes.

Although charge-free (that is, not requiring recharge of a gas medium as is necessary with of gas-filled bladders), the pulsation dampener of FIGS. 11A and 11B is not maintenance free. After some time in operation (e.g., 12 months), the compression material 1002 may become clogged with and/or deformed by mud and will typically require replacement due to lose of elasticity and/or accumulation of particulate matter within the pulsation dampener, necessitating shut-down of the pump system. In addition, the compression material(s) are typically fabricated and selected for operation within a specified or pre-determined pressure range. Changes to the nominal system operating pressure, whether intentional or resulting from a change in operating conditions, can necessitate change of the compression material, likewise requiring that the pump system be shut down. Referring back to FIG. 5, when maintenance of the commercially-available, charge-free pulsation dampener 501 becomes necessary, instead of replacing the compression material 1102, the seal can be replaced with a gasket and the compression material 1102 (and optionally also the cage 1101) is simply removed. One or more true maintenance-free system pulsation dampener(s) are installed at the location(s) and in the manner discussed above, obviating the need for the commercially-available, charge-free pulsation dampener 501 and further maintenance thereof. In many if not most instances, pulsation dampening performance can be improved by that substitution.

FIGS. 6A through 6E are side sectional and cross sectional views, respectively, of a pulsation dampening orifice assembly 502x that may be used as any one of orifice assemblies 502a, 502b, 502c, 502d, and/or 502n to implement one or more system pulsation dampening device(s). As illustrated in FIG. 6A, one exemplary pulsation dampening orifice assembly 502x includes a small enlarged volume, which may be formed (for example) by inserting a pipe segment 622 having a larger inner diameter (as little as 1-2 inches larger) that the pipe for the fluid flow path before and after the pulsation dampening orifice assembly. At the end of the enlarged volume is a fluid flow resistance or pressure drop feature such as an orifice plate or a drop tube. In the example depicted in FIGS. 6A and 6B, an orifice plate 624 or 626 (see FIG. 6E) is provided. However, those skilled in the art will recognize that a drop tube may be used instead. In accordance with the known art, the aggregate area of the openings through the orifice plate 624 or 626 is selected, in combination with the enlarged volume, to dampen pulsations within the fluid flow through the standpipe 506 and hose 516. As shown in FIG. 6C, the orifice plate 624 or 626 may be located at the opposite end (relative to the direction of fluid flow) of the enlarged volume formed by the pipe segment 622. Alternatively, the orifice plate 624 or 626 may be located in the middle of the enlarged volume, or anywhere in between. Multiple orifice plates may be disposed within a single enlarged volume. As illustrated in FIG. 6D, in a simple form, the pulsation dampening orifice assembly 502x simply comprises an orifice plate 6724 or 626 without any fluid-flow resistance produced by an adjoining or surrounding enlarged volume of the fluid flow path. As illustrated in FIG. 6D, the orifice plate 624 may have a plurality of orifices. As illustrated in FIG. 6E, the pulsation dampening orifice assembly 502x may comprise an orifice plate 626 with a single orifice. As noted above, orifice assemblies may or may not include liquid volumes to further enhance performance. FIGS. 6A and 6C show an expanded section 622 within which a liquid volume may be contained.

FIG. 7 is a diagrammatic view of an alternate design, with redundancy, for system pulsation dampener device(s) that may be installed in, proximate to, or downstream of a standpipe according to various embodiments of the present disclosure to implement the pulsation dampening orifice assembly portion(s) of FIG. 5. In the embodiment of FIG. 7, a pulsation dampening orifice assembly 502x includes a first assembly 701 and a second assembly 702 each including an enlarged volume and orifice plate, which are provided within each of two parallel fluid flow paths with control valves 703, 704, 705 and 706 (manually controlled, or under automated control) controlling which of the two flow paths is being used. This design provides redundancy in case of failure of a pulsation dampening orifice assembly, and in some high flow applications may be used as a low flow device.

FIG. 8 illustrates a diagrammatic view of a fluid delivery or drilling system 800 including fittings combining multiple fluid flow streams according to various embodiments of the present disclosure, which may also be used in embodiments of a drilling system 100 that include a pulsation dampener 102 installed after the fittings combining multiple fluid flow streams. The embodiment of the drilling system 800 illustrated in FIG. 8 is for illustration only. FIG. 8 does not limit the scope of this disclosure to any particular implementation of a drilling system.

There is not always a standpipe manifold within the fluid flow streams of a drilling rig. Some rigs bring the various mud pump discharge fluid streams together by simple fittings that join multiple fluid streams together into one stream. Referring now to FIG. 8, the drilling system 800 includes at least one fitting 802 and/or 804, a plurality of mud pumps 304, and piping 806 receiving the combined fluid flow streams.

The system pulsation dampener device 102, 202, 302, 402 or 502x (system pulsation dampener device 302 depicted in FIG. 6) can be used within piping 806 after the fittings 802 and/or 804. Pulsation dampeners such as system pulsation dampener device 102, 202, 302, 402 or 502x often have a volume of space, or reservoir, within the dampener where a certain amount of fluid may accumulate and pulsations are reduced before moving out of the pulsation dampener. The system pulsation dampener device 102, 202, 302, 402 or 502x may receive the combined mud pump discharge fluid streams. The fluid received by the system pulsation dampener device 102, 202, 302, 402 or 502x may be deposited into the interior volume of the pulsation dampener 102 or 202, combination standpipe manifold and pulsation dampener device 302, a pulsation dampener manifold 400, or orifice assembly pulsation dampener device(s) 502x. Fluid within the interior volume of the system pulsation dampener device would exit the system pulsation dampener device to travel to the drilling rig 114 via piping 806. The system pulsation dampener device can control the pulsations to be reduced in the combination, such as by creating a rotation within a chamber.

Since the system pulsation dampener device includes an interior volume, the problems of using a standpipe manifold can be avoided. The system pulsation dampener device does not have turns like a standpipe manifold, reducing the vibrations created as the separate streams intersect, and the system pulsation dampener device also provides pulsation dampening effects as it receives the combined fluid streams. The combined fluid streams may thus exit the system pulsation dampener device to travel to the drilling rig 114 with reduced or minimal energy being transferred to the rest of the downstream components.

Figure 9:
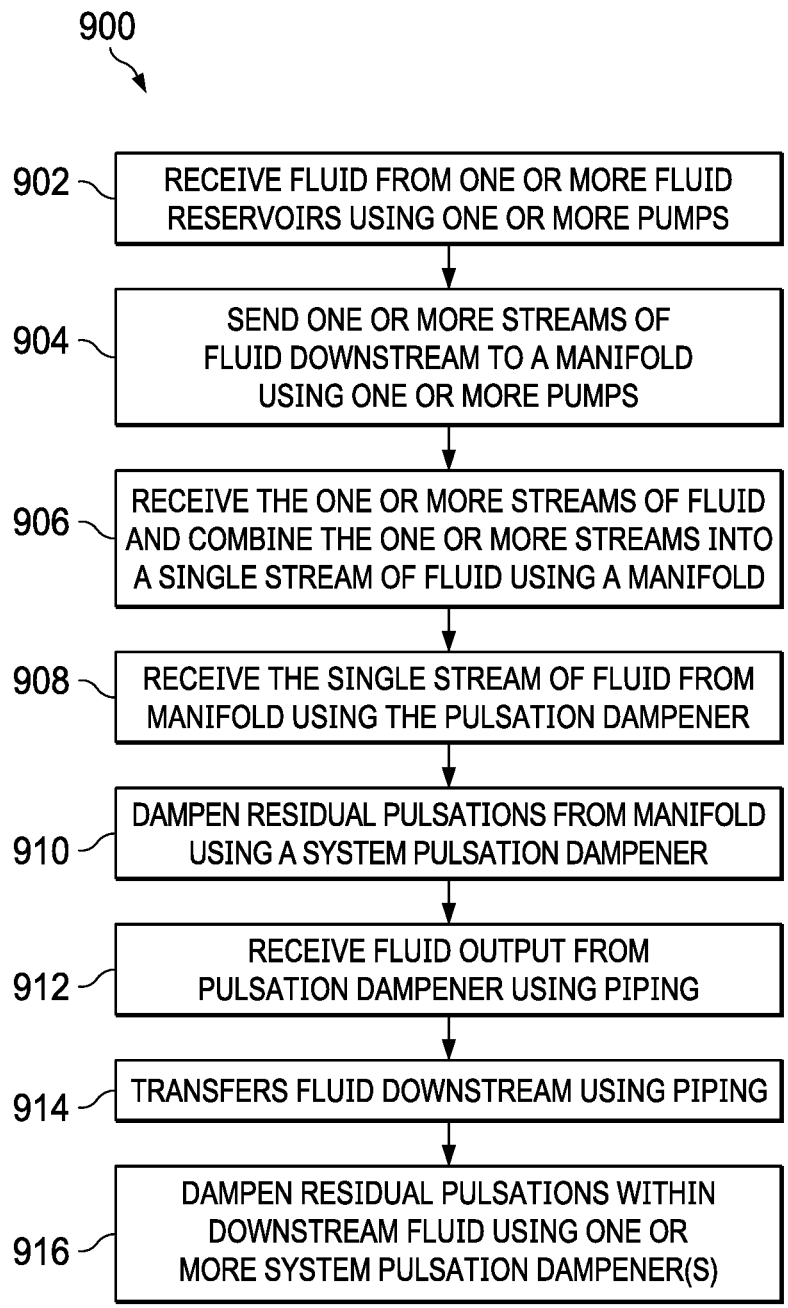
FIG. 9 is a high level flowchart of a fluid delivery and pulsation dampening process of a fluid delivery system according to various embodiments of the present disclosure.

FIG. 9 illustrates a flowchart of a fluid delivery and pulsation dampening process 900 of a fluid delivery system 100 or 500 according to various embodiments of the present disclosure. For example, the process 900 of FIG. 9 may be performed by a system 100 illustrated in FIG. 1 or a system 500 illustrated in FIG. 5, or those systems as modified according to FIG. 2, 3 or 4 (without, as appropriate, the steps relating to a manifold).

Referring now to FIG. 9, the process begins at step 902. At step 902, one or more pumps receive fluid from one or more fluid reservoirs, such as the mud pit 110 described herein. At step 904, the one or more fluid pumps send one or more streams of fluid downstream through the fluid delivery system. At step 906, a manifold receives the one or more streams of fluid and combines the one or more streams of fluid into a single stream of fluid. At step 908, the pulsation dampener receives the single stream of fluid from the manifold.

At step 910, the installed system pulsation dampener dampens the residual pulsations produced by the manifold. In some embodiments, the system pulsation dampener may perform the dampening operations when the one or more streams are received at the pulsation dampener, such as if the pulsation dampener is a combination standpipe manifold and pulsation dampener device replacing a standpipe manifold in the fluid delivery system. At step 912, piping receives fluid output from the system pulsation dampener. The piping may in some embodiments be a standpipe, such as the standpipe 106. At step 914, the piping transfers the fluid downstream. At step 916, one or more additional installed system pulsation dampener(s) dampen any residual pulsations within the fluid flow.

Figure 12A:
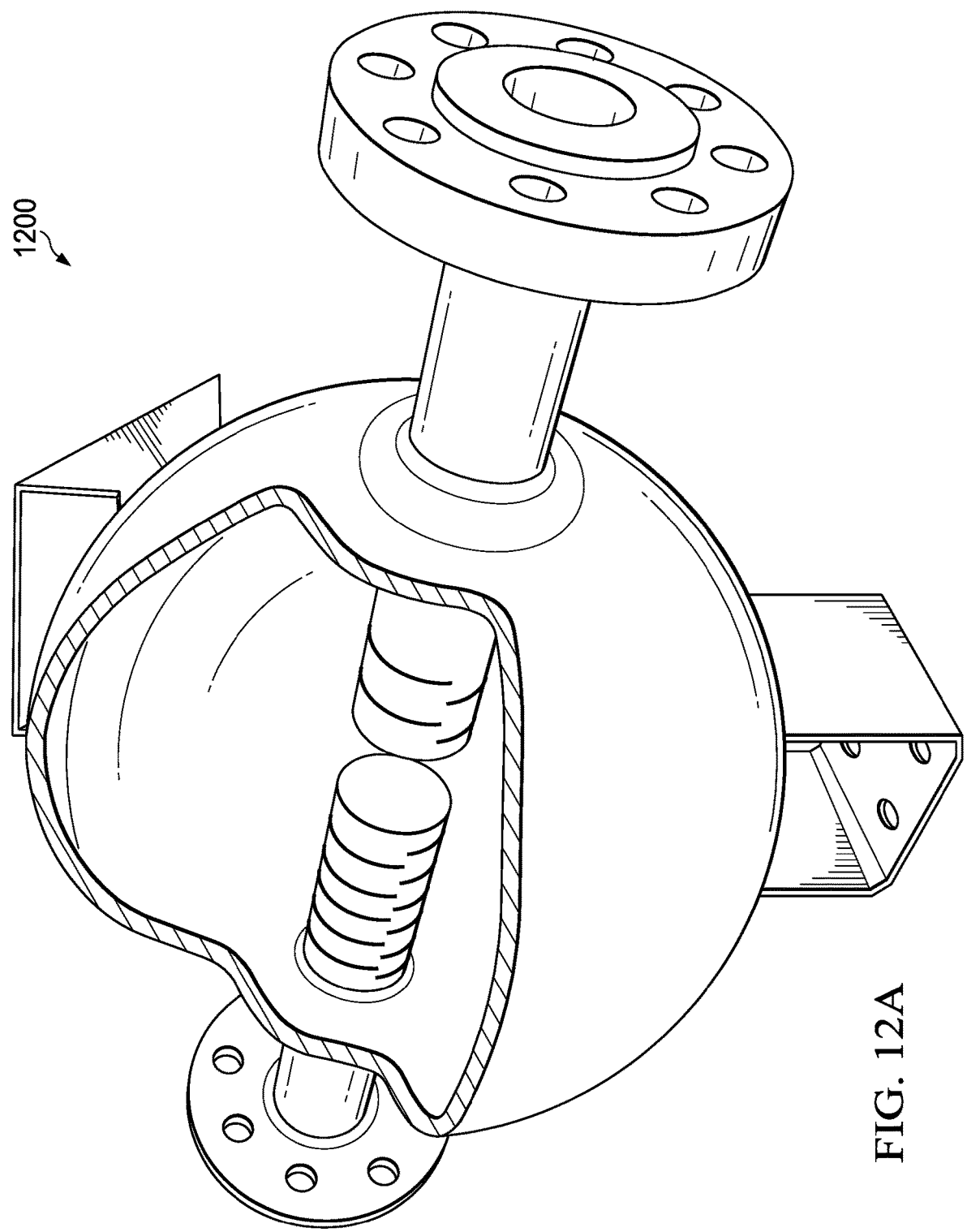

FIGS. 12A and 12B are cutaway and diagrammatic illustrations, respectively, of a maintenance free, reactive system pulsation dampener in accordance with embodiments of the present disclosure. Only a few, long-wear and simple components are utilized, enabling easy refurbishment and long duty cycles without adjustment. Gas-charging (i.e., bladder and valves/gauges) or use of compression materials are eliminated, such that maintenance is minimal (e.g., periodic inspection), with no cover removal required. The maintenance free, reactive system pulsation dampener 1200 has no moving parts, using the pumped fluid for pulsation dampening. Fluid 1201 with high magnitude pump pulsations is received via the inlet and fluid 1202 with low magnitude pump pulsations is discharged via the outlet, with fluid 1203 within the body reactively dampening the pump pulsation magnitude—that is, the pumped media reacts with the system fluid mass for pulsation reduction. An optional, removable pressure drop assembly 1204 may contribute to attenuation of pump fluid pressure pulsations.

Figure 13:
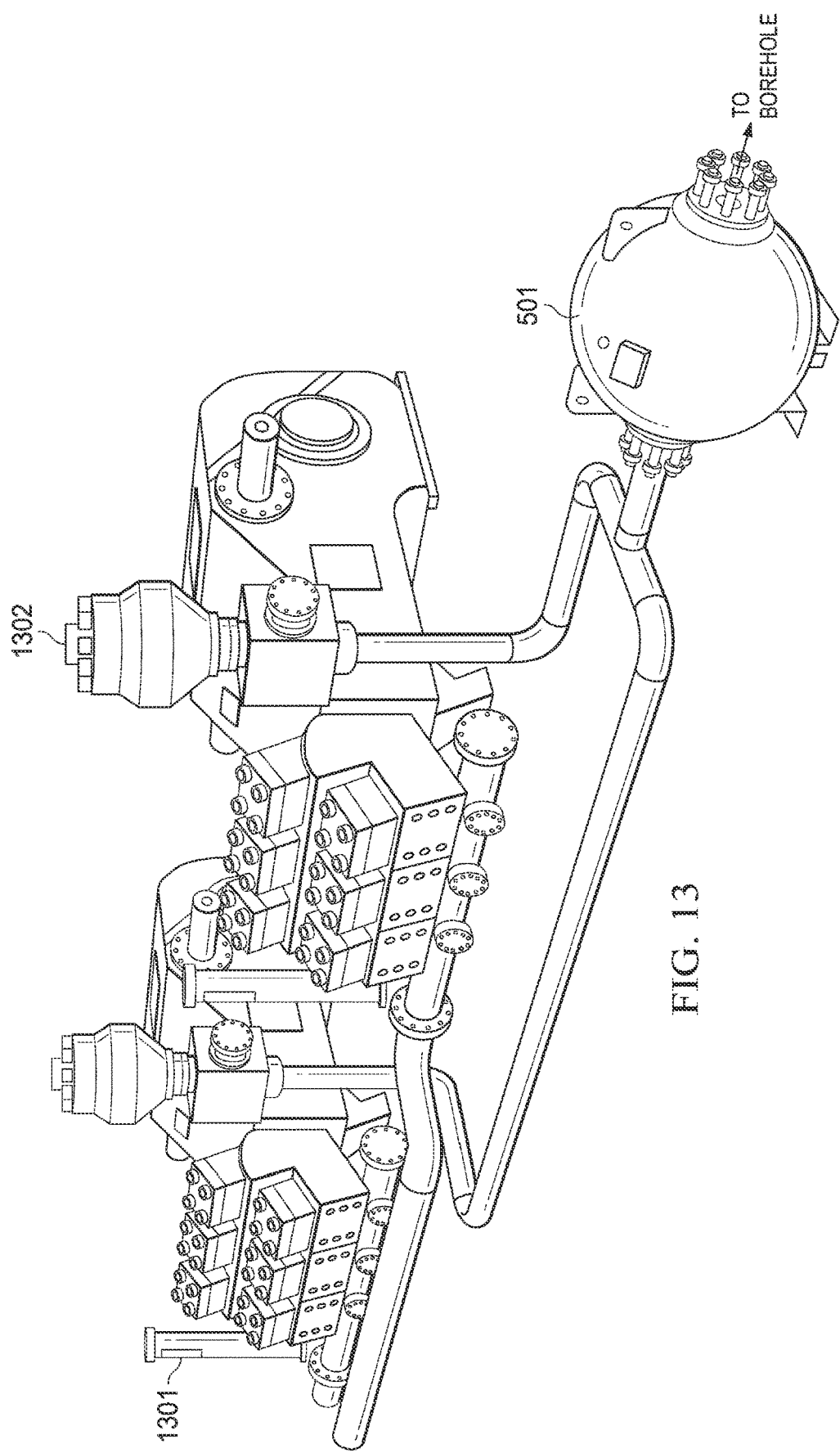
FIG. 13 illustrates installation of a system pulsation dampener in accordance with embodiments of the present disclosure.

FIG. 13 illustrates installation of a system pulsation dampener in accordance with embodiments of the present disclosure. In the example illustrated, two three-cylinder pumps having connected outputs each include a suction stabilizer 1301 connected to the inlet and a gas-charged (or charge-free) pulsation dampener 1302 at the outlet. In such configurations, space and support are key and in/out flow-through piping is required. For such appendage-mounted gas units 1301, 1302, pump skids and piping must be modified and space within the pump room is required. The space and cost of such requirements may be eliminated by using a single, suitably installed system pulsation dampener 501.

To retrofit the system of FIG. 13, any gas cartridges within the vessels of the suction stabilizers 1301 are removed and (optionally) replaced with an enhanced cellular tube for charge-free operation, with no piping changes necessary. Similarly, any gas-charged bladders within the appendage-mounted gas dampeners 1302 are removed and the vessels allowed to fill with fluid during operation, to provide initial dampening control (again, with no piping changes). Optionally, orifice plates or similar devices may be installed within the flow path after the vessels of the existing appendage-mounted gas dampeners 1302. A stand-alone reactive system pulsation dampener 501 is added into the pump system discharge line, connected using a simple connection using high-pressure discharge connectors, to remove lingering pulsations. The system pulsation dampener 501 is sized through design analysis and located downstream of the pumps and legacy dampening equipment. The system pulsation dampener 501 is preferably located where pressure pulsations are accumulated (e.g., within a network flow after the individual pump outputs are aggregated), and preferably as close to the pump(s) as possible.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A fluid delivery method, comprising:
    removing elastomeric compression material from an internal volume of a housing of a charge-free pulsation dampener, the housing coupled to an outlet of at least one fluid pump for pumping fluid through a borehole fluid delivery system;
    receiving fluid pumped by the at least one fluid pump in first piping connected to the outlet of the at least one fluid pump;
    at least partially dampening fluid pressure pulsations within the received fluid with the housing of the charge-free pulsation dampener without the compression material during transfer into second piping for delivery to a borehole; and dampening pulsations within the fluid transferred into and by the second piping using one or more pulsation dampeners connected within the second piping downstream from the housing and configured to dampen residual fluid pressure pulsations within the fluid transferred by the second piping.

2. The fluid delivery method of claim 1, further comprising:

receiving fluid from the at least one fluid pump at a manifold located downstream from the fluid pump.

3. The fluid delivery method of claim 1, wherein the one or more pulsation dampeners are configured to receive fluid from the at least one fluid pump and fluid from another fluid pump.

4. The fluid delivery method of claim 3, wherein the one or more pulsation dampeners are configured to output a single combined fluid including the fluid from the at least one fluid pump and the fluid from the other fluid pump.

5. The fluid delivery method of claim 3, further comprising:

removing elastomeric compression material from an internal volume of a second housing for a second charge-free pulsation dampener coupled to an outlet of the other fluid pump, wherein the one or more pulsation dampeners are located within the first piping downstream from the housing and downstream from the second housing, after a location at which pumped fluid outputs of the at least one fluid pump and the other fluid pump are aggregated.

6. The fluid delivery method of claim 1, wherein the one or more pulsation dampeners are located between a standpipe and the at least one fluid pump.

7. The fluid delivery method of claim 6, wherein the one or more pulsation dampeners are connected to a plurality of fluid pumps including the at least one fluid pump.

8. The fluid delivery method of claim 1, wherein the one or more pulsation dampeners includes a single pulsation dampener connected between a standpipe and a plurality of fluid pumps including the at least one fluid pump, the single pulsation dampener configured to receive all fluid streams from the plurality of fluid pumps, output a single fluid output stream, and provide pulsation dampening for the single fluid output stream.

9. The fluid delivery method of claim 1, wherein the one or more pulsation dampeners are sized to remove lingering pulsations not removed by the housing for the charge-free pulsation dampener.

10. A method of retrofitting a borehole fluid delivery system including a charge-free pulsation dampener coupled to an outlet of at least one fluid pump for pumping fluid through the borehole fluid delivery system, the method comprising:

removing elastomeric compression material from an internal volume of a housing of the charge-free pulsation dampener; and connecting a system pulsation dampener to piping receiving fluid pumped by the at least one fluid pump downstream from the housing, the system pulsation dampener configured to dampen residual fluid pressure pulsations within the fluid transferred by the piping.

11. The method of claim 10, further comprising:
receiving fluid from the at least one fluid pump at a manifold located downstream from the at least one fluid pump.

12. The method of claim 10, wherein the system pulsation dampener is configured to receive fluid from the at least one fluid pump and fluid from another fluid pump.

13. The method of claim 12, wherein the system pulsation dampener is configured to output a single combined fluid including the fluid from the at least one fluid pump and the fluid from the other fluid pump.

14. The method of claim 12, further comprising:

removing elastomeric compression material from an internal volume of a second housing for a second charge-free pulsation dampener coupled to an outlet of the other fluid pump, wherein the system pulsation dampener is located within piping downstream from the housing and downstream from the second housing, after a location at which pumped fluid outputs of the at least one fluid pump and the other fluid pump are aggregated.

15. The method of claim 10, wherein the system pulsation dampener is located between a standpipe and the at least one fluid pump.

16. The method of claim 15, wherein the system pulsation dampener is connected to a plurality of fluid pumps including the at least one fluid pump.

17. The method of claim 10, wherein the system pulsation dampener includes a single pulsation dampener connected between a standpipe and a plurality of fluid pumps including the at least one fluid pump, the single pulsation dampener configured to receive all fluid streams from the plurality of fluid pumps, output a single fluid output stream, and provide pulsation dampening for the single fluid output stream.

18. The method of claim 10, wherein the system pulsation dampener is sized to remove lingering pulsations not removed by the housing for the charge-free pulsation dampener.

19. A fluid delivery system, comprising:

a reciprocating fluid pump configured to pump fluid from an outlet of the reciprocating fluid pump through a borehole fluid delivery system including a borehole;

a reactive pulsation dampener coupled to the outlet of the reciprocating fluid pump, connected to receive fluid pumped by the reciprocating fluid pump, and comprising a housing with an internal cavity only containing the received fluid from the reciprocating fluid pump, the reactive pulsation dampener configured to partially dampen fluid pressure pulsations within the received fluid; and a flow-through pulsation dampener coupled between the outlet of the reciprocating fluid pump and a header pipe coupled to the borehole, the flow-through pulsation dampener configured to dampen residual fluid pressure pulsations remaining within fluid pumped into the header pipe after dampening of fluid pressure pulsations by the reactive pulsation dampener.

20. The fluid delivery system of claim 19, wherein the fluid pumped into the borehole includes fluid pumped by the reciprocating fluid pump and fluid pumped by another reciprocating fluid pump.

21. The fluid delivery system of claim 19, wherein the internal cavity of the housing for the reactive pulsation dampener is formed by removing elastomeric compression material from an internal volume of a housing of a charge-free pulsation dampener.

22. The fluid delivery system of claim 19, wherein an internal volume of the reactive pulsation dampener is insufficient to fully dampen fluid pressure pulsations within the received fluid.

* * * * *